United States Patent
Kolych et al.

(10) Patent No.: US 12,401,385 B2
(45) Date of Patent: Aug. 26, 2025

(54) INTERFERENCE-RESISTANT WIRELESS LOCALIZATION AND RANGING

(71) Applicant: Cypress Semiconductor Corporation, San Jose, CA (US)

(72) Inventors: Igor Kolych, Lviv (UA); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 436 days.

(21) Appl. No.: 17/954,156

(22) Filed: Sep. 27, 2022

(65) Prior Publication Data
US 2024/0106486 A1    Mar. 28, 2024

(51) Int. Cl.
*H04B 1/40* (2015.01)
(52) U.S. Cl.
CPC .................................... *H04B 1/40* (2013.01)
(58) Field of Classification Search
CPC ........................................................ H04B 1/40
USPC ............................................................. 455/73
See application file for complete search history.

(56) References Cited

U.S. PATENT DOCUMENTS

| | | | | |
|---|---|---|---|---|
| 10,630,336 | B1 * | 4/2020 | Freiman | H04L 25/03828 |
| 11,064,553 | B2 * | 7/2021 | Jackson | H04W 16/26 |
| 11,533,076 | B1 * | 12/2022 | Ranjbar | G01S 13/84 |
| 2020/0116817 | A1 * | 4/2020 | Chuo | H04L 27/2627 |
| 2022/0026524 | A1 * | 1/2022 | Maruyama | H01Q 3/24 |
| 2022/0131567 | A1 * | 4/2022 | Kim | H04B 1/40 |

* cited by examiner

*Primary Examiner* — Don N Vo

(57) ABSTRACT

Implementations disclosed describe devices for improving wireless localization and ranging operations. In an example embodiment, a circuit includes a receive chain configured to receive a first signal of a first frequency in a first frequency band. The circuit includes a transmit chain configured to transmit a second signal of a second frequency in a second frequency band. The circuit includes an active reflection circuit coupled between the receive and transmit chains. The active reflection circuit includes a frequency conversion scheme. The frequency conversion scheme is configured to receive an input signal from the RX chain at the first frequency, convert the input signal to an output signal at the second frequency, and provide the output signal to the TX chain.

18 Claims, 11 Drawing Sheets

INTERFERENCE-RESISTANT WIRELESS LOCALIZATION AND RANGING

TECHNICAL FIELD

The disclosure pertains to wireless networks; more specifically, to optimizing performance of localization and/or ranging operations of devices of wireless networks by utilizing signal reflection circuitry.

BACKGROUND

Localization of wireless devices of wireless networks is a target functionality in many applications. For example, applications tracking locations of devices in an environment, or detecting proximity of wireless keys to locks, may include localization and/or ranging operations performed by devices of a wireless network. Ranging operations between wireless devices may suffer from processing delays, signal interference, or the like. Such effects may decrease the accuracy or ranging and/or localization operations between devices.

DETAILED DESCRIPTION

Figure 1:
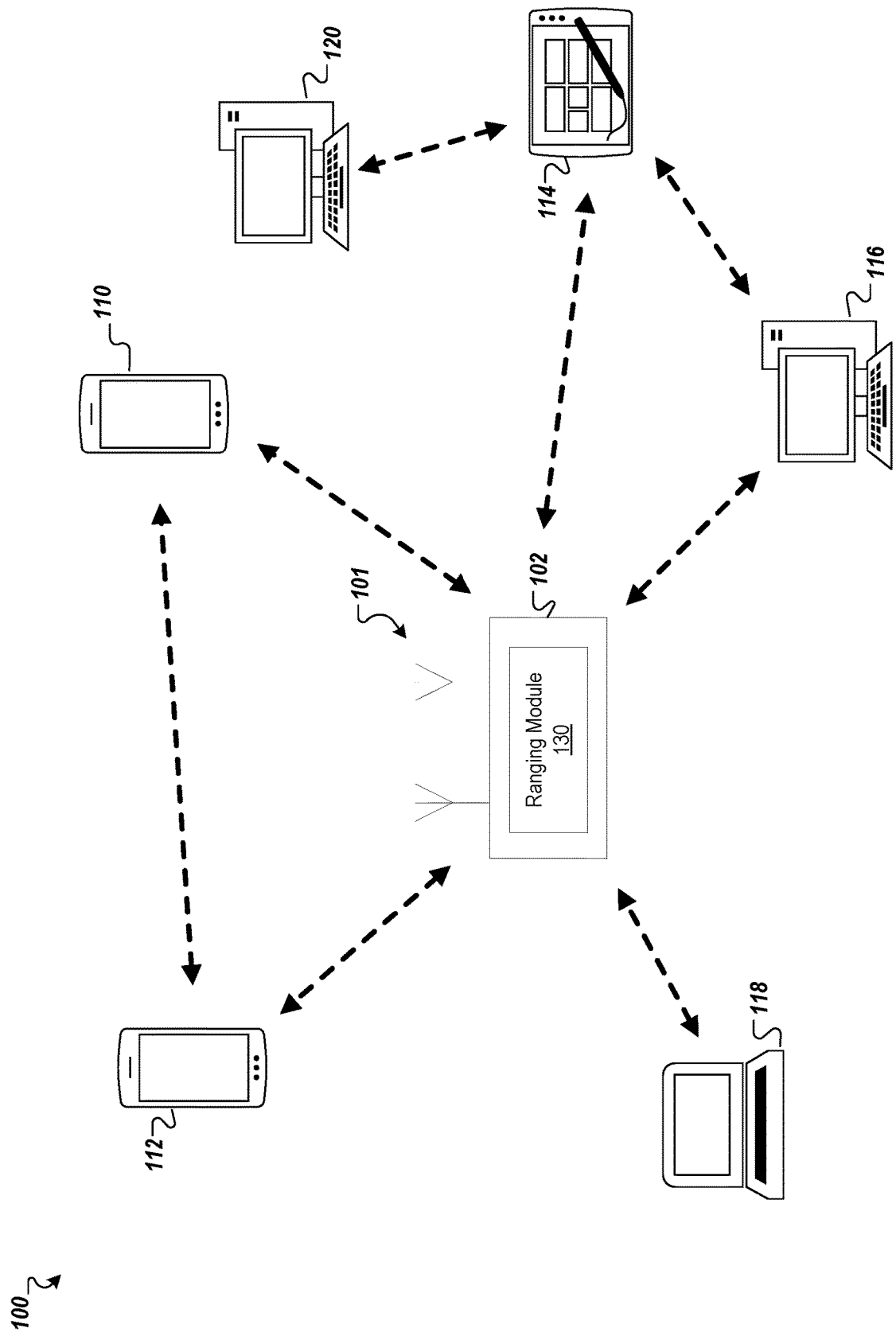
FIG. 1 illustrates one exemplary implementation of devices supported by a wireless network whose performance may be optimized by wireless localization and/or ranging operations, according to some embodiments.

Aspects of the present disclosure are directed at optimizing performance of localization and/or ranging operations between devices of wireless networks. A wireless communication device may be configured to receive and/or transmit signals in multiple frequency bands. Delays to signals sent and received between devices may be utilized to estimate the distance between the devices. In some systems, multiple ranging operations (e.g., multiple distance estimations) may be combined to estimate relative locations of multiple wireless devices. In some systems, a device may receive a ranging signal in a first frequency band, perform frequency conversion and reflection operations, and transmit a response signal in a second frequency band.

Ranging operations are performed in a variety of wireless communication networks. In one illustrative example, wireless ranging operations between a client device (e.g., a cell phone) and a vehicle may be utilized to detect proximity of the device to the vehicle and lock/unlock a vehicle door. In another example, multiple ranging operations may be utilized between stationary wireless access points and radio frequency identification (RFID) tags for indoor navigation operations.

Various client devices may use different protocols for wireless connection at a number of radio frequencies. For example, IEEE 802.11b and 801.11g devices are capable of connecting at the 2.4 GHz band, whereas 802.11n, 802.11ac, and 802.11ax devices may be capable of using both 2.4 GHz and 5 GHz bands. Even though wireless environments typically use one or both of these two bands, some protocols may use other frequencies. For example, 802.11ad protocol uses the 60 GHz band, which is capable of supporting—within a distance of about 10 feet—a larger bandwidth and a bit stream rate than is higher than bit streams of either 2.4 GHz or 5 GHz bands.

Conventional wireless ranging operations include a first device that sends a ranging message to a second device. The second device processes the ranging message and returns a response message to the first device. Calculations are performed based on time stamps associated with sending and receiving the messages to estimate the message airtime, and the speed of light utilized to determine an estimation of the distance between the devices. This process typically includes a long reflection time compared to message travel time. This limits the accuracy of the ranging operations.

In some ranging systems, reflection may be performed immediately by the second device to decrease reflection process time. However, in this case, the first device may still be transmitting the ranging message while the second device is transmitting the response message. Interference between the ranging message and response message may decrease the accuracy or viability of such a system. For example, a device may detect the message being sent by the device as well as a message sent by another device. If the two messages are of the same (or similar) frequency, it may be difficult or impossible to separate components of one message from the other.

Implementations described herein may address one or more of these shortcomings with traditional systems. In some embodiments, an initiator device (e.g., a device that initiates a ranging operation) may transmit a first ranging message to a reflector device utilizing a communication frequency belonging to a first wireless communication frequency band. In some embodiments, the two devices may be communicating via a wireless local area network (WLAN) connection. In some embodiments, the communication frequency associated with the ranging message may be a channel of a WLAN communication band, e.g., a channel of the 2.4 GHz band, a channel of the 5 GHz band, a channel of the 5 GHz band, a channel of the 7 GHz band, a channel of the 60 GHz band, or the like. The reflector device may be configured to perform frequency conversion operations on the ranging message to generate a reflected message of a different frequency than the ranging message. The reflected message may be of a frequency belonging to a second communication band, e.g., a channel of the opposite of the 2.4 GHz band or the 5 GHz band than the ranging message, a channel of the 60 GHz band, or the like. The initiator and reflector devices may then be sending and receiving messages in different frequency domains which overlap in time, and may filter incoming signals to isolate the ranging response from the outgoing ranging message for more effective ranging operations.

In some embodiments, the reflector device may be a wireless communication device, e.g., may be configured to communicate via a WLAN. The reflector may include a connection between input components (e.g., a receive (RX) chain associated with the 2.4 GHz frequency band) and output components (e.g., a transmit (TX) chain associated with the 5 GHz band) to facilitate efficient reflection of the ranging message. In some embodiments, the connection may be in the analog domain of the device. In some embodiments, the connection may be in the digital domain of the device. In some embodiments, circuitry of the reflector device may add additional input (e.g., additional message data) to the reflected message (e.g., ranging may be performed as part of normal communication messages).

In some embodiments, the reflector device may not be configured for independent WLAN communication, e.g., a radio frequency identification (RFID) tag. Such a reflector device may be a passive device or an active device (e.g., externally powered, including active amplifiers, etc.). In some embodiments, the reflector device may be configured to perform frequency multiplication operations to approximately convert an incoming signal from a frequency associated with a first frequency band (e.g., a channel of the 2.4 GHz wireless communication band) to a frequency associated with a second frequency band (e.g., a channel of the 5 GHz wireless communication band).

FIG. 1 illustrates one exemplary implementation of devices supported by a wireless network 100 whose performance may be optimized by wireless localization and/or ranging operations, according to some embodiments. Wireless network 100, such as a wireless local-area network (WLAN), in one implementation, may have a base station 102 equipped with one or more antennas 101 supporting receiving and transmitting signals within a first frequency range (which may include the 2.4 GHz band) and a second frequency range (which may include the 5 GHz band). In one implementation, the first frequency range may correspond to the range of frequencies commonly referred to as the 2.4 GHz regulatory domain, such as the range from 2,400 to 2,485 MHz, or any sub-range within this frequency range. In one implementation, the second frequency range may correspond to the range of frequencies commonly referred to as the 5 GHz regulatory domain, such as the US range from 5,180 to 5,874 MHz, or any sub-range within this frequency range. In some implementations, a broader range of frequencies may be used. For example, European regulations may allow frequencies down to 5,160 MHz. In other implementations, other frequency ranges may be used, such as a range including the 60 GHz range or any other range used for wireless networking. In some implementations, the first frequency range and the second frequency range may be broad enough to contain multiple regulatory bands. For example, in one implementation, the first frequency range may include both the 2.4 GHz and 5 GHz bands, whereas the second frequency range may contain the 60 GHz band. In some implementations, the 5 GHz band may be within the first frequency range, whereas 2.4 GHz may be within the second frequency range. In some embodiments, devices of network 100 may be configured to communicate using more than two frequency ranges (e.g., the 2.4 GHz band, the 5 GHz band, and the 60 GHz range).

The base station 102 may be equipped with two (or more) separate antennas 101, in some implementations. In other implementations, a single antenna 101 may be used for both (or all) frequency ranges. For example, the antenna 101 may be a multiple-input and multiple-output (MIMO) antenna. The base station 102 may include a localization and/or ranging module to perform operations associated with wireless device localization and ranging. Localization and/or ranging module may be integrated into the base station 102 or be located outside the base station 102 and communicate with the base station electronically or wirelessly.

The base station 102 and/or other devices of network 100 (e.g., smartphones 110 and 112, laptop 118, etc.) may have two or more access points (APs) to enable wireless connectivity of client devices to the network (e.g., WLAN network) supported by base station 102. A first AP of the base station 102 may use the first frequency range of 2.4 GHz, whereas a second AP of the base station 102 may use the second frequency range of 5 GHz, in one implementation. An AP is defined as a set of hardware and software components of a device (e.g., base station 102, client device, etc.) facilitating wireless connection functionality for the corresponding frequency range. In some implementations, multiple APs may be implemented on a single device (e.g., as a single chip.) In some implementations, all components of different APs (such as antennas, front-end modules, amplifiers, physical radio layers, media-access control layers, or the like) may be separately implemented. In some implementations, different APs may share some of the components. For example, two AP may use the same antenna (such as a MIMO antenna), the same physical radio layer, and/or the same processor (such as a CPU). Two APs may be supported by the same software. In some instances, a first AP may be implemented as a first AP device (e.g., as a first chip) and a second AP implemented as a second AP device (e.g., as a second chip). In other implementations, the first AP device and the second AP device may be communicatively coupled to each other. In some implementations, the first AP device and the second AP device may be attached to the same motherboard of the associated device.

The wireless network 100 may support multiple client devices. For example, some client devices may establish WLAN associations with the base station 102 using the 2.4 GHz frequency range, whereas other devices may establish associations using the 5 GHz frequency range. Additionally, some of the client devices may establish personal area network (PAN) associations with the base station 102 and/or with other devices. In some implementations, PAN associations may use the 2.4 GHz frequency band. Some devices may be capable of establishing associations of different types with the base station 102. For example, a smartphone 110 may be capable of accessing the base station 102 using either WLAN or PAN or both. The base station may use the same 2.4 GHz antenna for WLAN and PAN or may have separate antennas for each of these networks. Other devices of the wireless network 100 may similarly be capable of dual 2.4/5 GHz connectivity.

Many types of devices may be included in network 100, e.g., smartphones, laptops, personal computers (PCs), tablets, Internet of Things devices, smart wearables (e.g., smart watches), etc. Devices of network 100 may be capable of forming multiple wireless connections, e.g., smartphones 110 and 112 may form connections with base station 102 and with each other, tablet 114 may establish communication with a personal computer (PC) 116 and PC 116 may establish communication with base station 102, etc.

One, some, or all of the devices of network 100 may also be equipped with a localization/ranging module (e.g., ranging module 130), according to some implementations. For example, laptop 118 may include a ranging module (e.g., dedicated circuitry for performing ranging, integrated ranging circuitry, ranging implementation instructions housed in memory, etc.) and may perform ranging operations to determine the physical distance of laptop 118 from base station 102. Base station 102 may include ranging module 130, e.g., to facilitate localization and/or ranging operations with other devices of the network. As a further example, smartphones 110 and 112 may each include a ranging module, and may utilize ranging techniques in accordance with this disclosure to determine the distance between smartphone 110 and smartphone 112, the distance between smartphone 112 and base station 102, and/or the distance between smartphone 110 and base station 102. In some embodiments, localization procedures may be performed. For example, a mobile device may utilize ranging with multiple stationary devices to determine a location of the mobile device in relation to the other devices. Tablet 114 may utilize ranging data established with PCs 116 and 120 and base station 102 for performing localization operations, for example. Though ranging module 130 is shown in connection with base station 102, any combination of devices may include circuitry configured to reflect signals for localization/ranging, to frequency convert and reflect signals for localization/ranging, etc.

Figure 2:
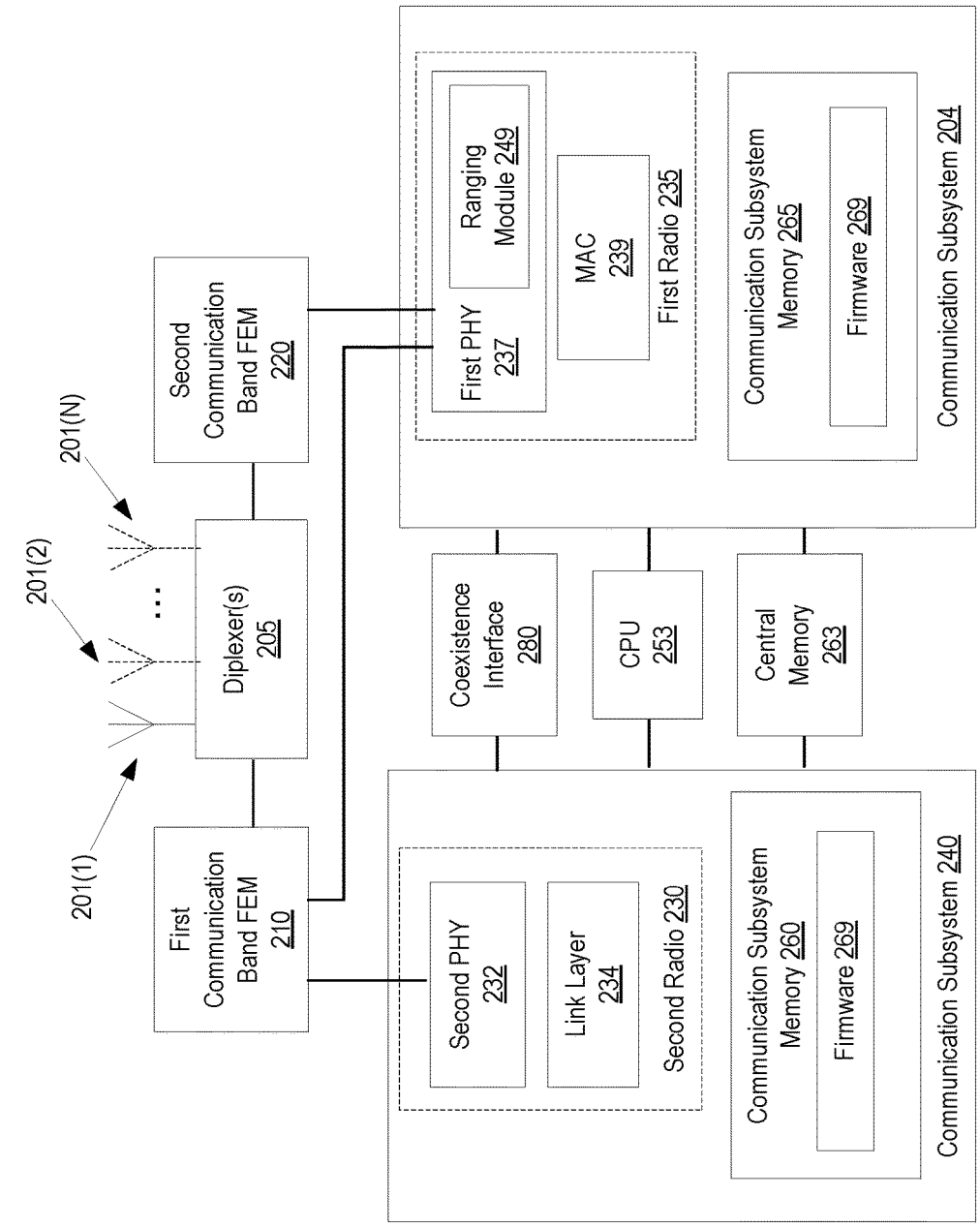
FIG. 2 depicts an exemplary dual-band wireless communication device for performing localization and/or ranging operations, according to some embodiments.

FIG. 2 depicts an exemplary dual-band wireless communication device 200 for performing localization and/or ranging operations, according to some embodiments. Device 200 may be configured to communicate via one or more wireless networks, e.g., wireless local area network (WLAN) networks. In some embodiments, device 200 may be configured to communicate utilizing multiple communication frequencies. For example, device 200 may be configured to communicate wirelessly at one or more frequencies included in one or more wireless communication bands.

Device 200 may be configured for communication utilizing various types of wireless networks. In some embodiments, device 200 may be configured to communicate via a WLAN network (e.g., a Wi-Fi® local area network). In some embodiments, device 200 may be configured to communicate via a personal area network (PAN, e.g., a Bluetooth® personal area network). A communication network may support multiple access points (APs). For example, a communication network may support wireless communication via the 2.4 GHz communication band and the 5 GHz communication band.

Wireless communication and ranging components of device 200 may be implemented as an integrated circuit (IC) device (e.g., disposed on a single semiconductor die) that provides dual-band access functionality, such as dual-AP, for the wireless network (e.g., WLAN) and further enable the capability to determine physical distances between devices of the network. As disclosed above in reference to FIG. 1, an AP is defined as a set of hardware/software components with functionality for supporting wireless connectivity for a given frequency range, rather than as a specific set of particular hardware and/or software components. The term "dual-AP" should be understood as referring to the functionality that enables more than one AP on the same device; the number of APs may be two in some implementations, but may be more than two (e.g., three, four, and so on) in other implementations. Ranging or localization capability may refer to functionality that generates an estimate of the distance between one or more pairs of devices. In some embodiments, accurate ranging (e.g., distance determination) may be further extended to localization (e.g., relative location determination of various devices of the network). In some embodiments, ranging operations may include a device transmitting and/or receiving messages utilizing multiple APs, e.g., may include sending and/or receiving messages in two different communication bands, such as the 2.4 GHz band and the 5 GHz band.

Device 200 may support various types of wireless networks. In one implementation, device 200 may include a WLAN (e.g., a Wi-Fi® local area network) controller (e.g., communication subsystem 204) and a PAN (e.g., a Bluetooth® personal area network) subsystem (e.g., communication subsystem 240). The WLAN may support two APs, for example, the first AP corresponding to the 2.4 GHz frequency range and the second AP corresponding to the 5 GHz frequency range, in one implementation. The PAN may operate within the same first frequency range, in one implementation. The device 200 may include (or be connected to) one or more antennas 201(1), 201(2), . . . 201(N) to receive and transmit radio waves within the frequency ranges used by the APs of the device 200. The number of antennas 201 may be the same as the number of APs of the WLAN, in one implementation. In other implementations, the number of antennas 201 may be more than the number of APs. Some APs may use multiple antennas 201. In some implementations, a subsystem may use a designated antenna (or multiple antennas). In some implementations, the PAN subsystem may use antennas 201 that are shared with the communication subsystem 204. In some implementations, a single multi-input multi-output (MIMO) antenna may be used.

The signal received by the antenna(s) 201 may be fed via a diplexer (or multiple diplexers, in some embodiments) 205 to the front-end module (FEM) 210 for the first frequency range (e.g., serving both WLAN and PAN) and to the FEM 220 for the second frequency range (serving WLAN, in one implementation). In some implementations, a multiplexer may be used in place of the diplexer 205, for example, where more than two APs are supported. In some implementations, no diplexer or multiplexer may be used, and each antenna may have a separate FEM. The FEMs 210 and 220 may include filters (e.g., band-pass filters), low-noise radio-frequency amplifiers, down-conversion mixer(s), and other circuitry (analog and/or digital) that may be used to process modulated signals received by the antenna into signals suitable for use in ranging applications, and/or into baseband analog-to-digital converters. Similarly, the FEMs 210 and 220 may process analog signals output to the antennas 201 for transmission. The FEMs 210 and 220 may be connected to a first radio 235. First radio 235 may be associated with a particular type of communication, a particular wireless network, or the like. For example, first radio 235 may be associated with WLAN communication. The first radio 235 may be a dual-band radio providing the first communication subsystem 204 with the capability to concurrently process signals through two WLAN FEMs operating at two different frequency ranges. The first radio 235 may include a first physical layer component (WLAN PHY) 237, such as 802.11ac PHY, that may transform the received digital signal to frames (data packets) that can then be fed into a media access control layer (e.g., WLAN MAC) 239, such as 802.11ac MAC. The first PHY 237 may include intermediate-frequency amplifiers, analog-to-digital converters, inverse Fourier transform modules, de-parsing modules, interleavers, error correction modules, scramblers, PHY-MAC padding layers, and other components. In some implementations, all PHY components may be integrated into the same chip. In some implementations, the first MAC 239 may be integrated with first PHY 237 on the same chip. In other implementations, some components, e.g., the analog-to-digital converters and/or intermediate-frequency amplifiers, may be executed by separate circuitry of the first radio 235 but outside the first PHY 237. In some implementations, some of the first PHY 237 components may be combined with the FEMs components.

In some embodiments, components for performing ranging and/or localization may be included in first radio 235. For example, first PHY 237 of first radio 235 may include ranging module 249. Ranging module 249 may include circuitry, hardware components, software components (e.g., firmware) for performing localization and/or ranging operations. For example, a signal may be received by first radio 235 via a first communication band FEM 210 at a first frequency. First radio 235 may include circuitry to generate a reflected signal for ranging at a second frequency (e.g., ranging module 249). First radio 235 may provide the reflected signal to a second communication band FEM 220 for transmission via one or more antenna 201.

In some implementations, MAC 239 may not be a part of the first radio 235 but instead may be implemented on a central processing unit (CPU) 253. In other implementations, MAC 239 may be implemented as a component separate from both the CPU 253 and the first radio 235. In one implementation, the interaction of the components may happen as follows. The CPU 253 executing a logical link control (LLC), in communication with a communication subsystem memory 265, may prepare a data packet, such as a MAC service data unit, and provide it to the MAC 239, which may add additional bytes (e.g., header bytes and/or tail bytes) to form an appropriate 802.11ac MAC protocol data unit before sending the protocol data unit to the first PHY 237 for digital-to-analog processing, intermediate-frequency amplification, and filtering, in one implementation. The analog signal output by the first PHY 237 may then be provided to the FEMs 210 and/or 220 for radio-frequency processing and transmission through one or more of the antennas 201. The reverse process may occur when an incoming radio-frequency signal is received through the antenna(s) 201.

The dual-AP functionality may be provided by some or all of the above-disclosed components. In one implementation, the disclosed components of the communication subsystem 204 may be implemented on a single Real Simultaneous Dual Band (RSDB) chip. In one implementation, the CPU 253 may allocate a first logical processor (or CPU core) to enable the first AP corresponding to the first frequency range (e.g., 2.4 GHz) and a second logical processor (or CPU core) to enable the second AP corresponding to the second frequency range (e.g., 5 GHz). In another implementation, a single logical processor (or CPU core) may execute multiple APs. The logical processors may execute LLCs for the corresponding APs, prepare MAC service data units for these APs, and provide the service data units to the MAC(s) 239 for processing into MAC protocol data units and transmitting the protocol data units through the first PHY 237 and FEMs 210 and 220. A single MAC 239 may be processing and outputting MAC data for both APs, in one implementation. In another implementation, multiple MACs 239 may be processing and outputting MAC data, where a separate AP-assigned MAC 239 communicates with the AP-assigned logical processor of the CPU 253. In some implementations, MACs 239 may be implemented as software executed by the CPU 253, e.g., by the corresponding logical processors. Elements of device 200, communication subsystems 204 and 240, radios 235 and 230, etc., may be configured to operate in any applicable frequency band, e.g., around 2.4 GHz, 5 GHz, 6 GHz, 7 GHz, 60 GHz, or any other frequency range used for wireless communication.

The double output of the MAC(s) 239—namely, the first AP MAC protocol data units and the second AP MAC protocol data units—may be fed to the first PHY(s) 237 for separate digital-to-analog processing and transmission, as described above. A single PHY 237 may be capable of processing and transmitting multiple AP data units, in one implementation. For example, the first PHY 237, using the same circuitry and components, may be processing and transmitting data units for the first AP during a first set of discrete time intervals and for the second AP during a second set of discrete time intervals, so that there may be no overlap between the first time intervals and the second time intervals. In another implementation, there may be multiple separate PHYs for different APs. For example, a 2.4 GHz PHY 237 may have dedicated 2.4 GHz components for the first AP, such as intermediate-frequency amplifiers, analog-to-digital converters, interleavers, error correction modules, scramblers. Likewise, a 5 GHz PHY 237 may have dedicated 5 GHz components for the second AP. The analog signals produced by double PHY 237 may then be output to separate FEMs 210 and 220, mixed by the diplexer 205, and transmitted through one or more of the antennas 201 concurrently. The received signals corresponding to two APs may be processed in a similar fashion in a reverse order.

The disclosed implementations allow scalability to support more than two APs. For example, the number of the FEMs, may be equal to the number of APs, the diplexer 205 may be replaced with a multiplexer, and the number of dedicated PHY layers 237 may be equal to the number of APs, in one implementation. A single MAC 239 may be used to process data units for multiple APs or separate dedicated WLAN MAC layers 239 may be implemented, with a separate logical processor of the CPU 253 assigned to each MAC 239.

The communication subsystem 204 may also include various additional components for performance of wireless communication functions. Communication subsystem 204 may include a power management unit (PMU) which may manage clock/reset and power resources for the other components of the communication subsystem 204. The communication subsystem 204 may further contain an input/output (I/O) controller to enable communications with external devices and structures. In some implementations, the I/O controller may enable a general-purpose I/O (GPIO) interface, a USB I²C module, an I²S and/or a PCM digital audio module, and other I/O components.

The device 200 may support multiple networks on the same platform, such as the RSDB chip, in one implementation. For example, in addition to the communication subsystem 204 enabling a first wireless communication (e.g., communication subsystem 204 may be associated with WLAN communication), the device 200 may also include a second communication subsystem 240. The communication subsystem 240 may enable a second wireless communication, e.g., a PAN, which may share one or more frequency ranges with the first wireless communication (e.g., WLAN). For example, the PAN may be operating in the first frequency range associated with the first communication band FEM 210. In some implementations, the first communication subsystem 204 may share the FEM 210 and one or more antennas 201 with the second communication subsystem 240. In some implementations, the subsystem 240 may have a dedicated FEM. The shared FEM 210 may be providing/receiving signals to/from a second radio 230. The second radio 230 may be a single-band radio and include a second PHY layer 232 having components that may be similar to the components of the first PHY layer 237. In some implementation, the second PHY 232 may have some components that the first PHY 237 may lack or, vice versa, the second PHY 232 may have some additional components. In some implementations, the second PHY 232 may share some components with the first PHY 237. The second PHY 232 may communicate with a link layer 234, which may be a component of the second radio 230, in some implementations, or may be realized as a software component executed by the CPU 253. The link layer 234 may have a number of states, such as advertising, scanning, initiating, connection, standby. The communication subsystem 240 may have a memory 260, and other components such as a power management unit, an I/O controller, etc., which may serve functions similar to the functions performed by their counterparts of communication subsystem 204. Second radio 230 may perform similar functions to first radio 235, e.g., link layer 234 may include a second MAC. In some embodiments, second radio 230 may be coupled to systems for operating in multiple communication bands. In some embodiments, first radio 235 and second radio 230 may each be capable of communicating in multiple communication bands, e.g., device 200 may be a 2×2 Wi-Fi device.

The device 200 may include a coexistence interface 280 to facilitate coexistence of the communication subsystems 204 and 240. Because multiple communication methods (e.g., WLAN and PAN) may operate within the same frequency ranges and on the same device (e.g., chip), the coexistence interface 280 may help to resolve potential performance and reliability issues of both networks. For example, the coexistence interface 280 may mitigate interference between the networks through temporal, spatial, and frequency isolation, channel selection, and the like.

The communication subsystem memories 265 and 260 may include read-only memory (ROM) and/or random-access memory (RAM). In some implementations, memory may be shared between the subsystems 240 and 204, as shown by a central memory 263, for example. In some implementations, firmware 269 may be stored in the communication subsystem memories 260 and/or 265 and/or in the central memory 263. In some implementations, the device 200 may have only one processor, such as the CPU 253, which serves all communication subsystems. In other implementations, separate communication subsystems may include separate processing units, some subsystems may share one or more processing units, etc.

Figure 3:
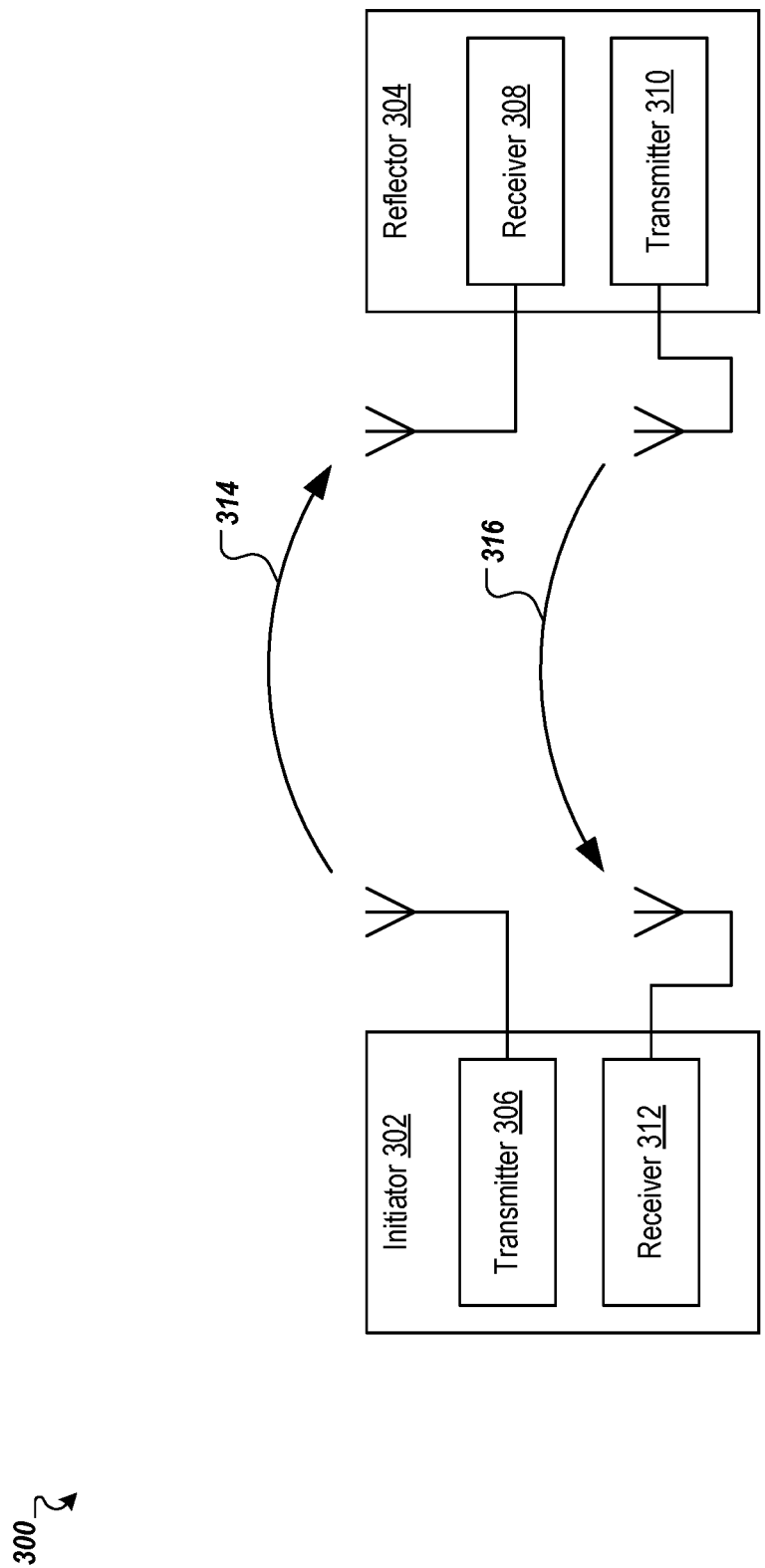
FIG. 3 is a diagram depicting a system of devices for performing localization/ranging operations, according to some embodiments.

FIG. 3 is a diagram depicting a system of devices 300 for performing localization/ranging operations, according to some embodiments. System 300 includes two devices configured to perform wireless ranging operations, initiator 302 and reflector 304. In some embodiments, an assignment of a device as an initiator or reflector for ranging operations may be temporary, e.g., two devices may establish a communication connection, and, in the course of performing ranging operations, one device may act in some instances as initiator and in some instances as a reflector, etc. In some embodiments, one device of a communication connection may always act as initiator or reflector, e.g., a determination of which device acts as initiator/reflector may be made based on differences between devices, intended use of the devices, set by a user, etc. In some embodiments, system of device 300 may be configured to perform ranging operations while avoiding interference, e.g., self-interference between a first message transmitted by a device and a second message to be received by the device. Avoidance of interference may be performed by separating messages associated with ranging operations in frequency space.

Initiator 302 includes transmitter 306 and receiver 312. Reflector 304 includes receiver 308 and transmitter 310. Initiator and reflector 304 may include one or more antennas for sending and/or receiving wireless messages. In some embodiments, transmitter and receiver of one device may share the same antenna, e.g., transmitter 306 and receiver 312 may utilize a single antenna. In some embodiments, transmitter and receiver of a device may include shared components of a radio, e.g., the transmitter and receiver may include a TX chain and an RX chain of a radio, such as first radio 235 of FIG. 2. In some embodiments, a transmitter and a receiver of a device may be part of separate communication subsystems (e.g., communication subsystem 204 and communication subsystem 240) with a data link for transferring data between the subsystems (e.g., a data-transferring link between first radio 235 and second radio 230).

In some embodiments, initiator 302 transmits a ranging message 314 via transmitter 306 to reflector 304. Ranging message 314 may be transmitted at a particular frequency, e.g., a frequency channel belonging to a first communication frequency band, for example, the 2.4 GHz communication band. For purposes of illustration, and not of limitation, ranging message 314 may take the form $$M_r = s(t)e^{i\omega_r t}$$

wherein $M_r$ is the ranging message, $s(t)$ is an information packet (e.g., quadrature amplitude modulation modifying the carrier frequency, carrying information, or composed of multiple sub-carriers), and $\omega_r$ is the carrier frequency of the ranging message 314 (e.g., a frequency associated with a channel of the 2.4 GHz communication band).

Reflector 304 may receive ranging message 314 via receiver 308. Reflector 340 may be configured to receive ranging message 314 via receiver 308 and generate returned ranging message 316 (e.g., an echo message, a frequency-shifted echo message, etc.) for transmission via transmitter 310. In some embodiments, returned ranging message 316 may be generated in a different frequency range than ranging message 314. For example, ranging message 314 may be transmitted via a first communication band, e.g., the 2.4 GHz wireless communication band, and returned ranging message 316 may be transmitted via a second communication band, e.g., the 5 GHz wireless communication band. In some embodiments, ranging message 314 may be sent via the 5 GHz band, and returned ranging message 316 may be sent via the 2.4 GHz band. In some embodiments, other communication bands (e.g., the 60 GHz communication band, the 6 GHz communication band, the 7 GHz communication band, or the like) may be utilized for one or more of ranging message 314 or returned ranging message 316.

Reflector 304 may be configured to generate returned ranging message 316 without/before decoding the content of ranging message 314 (e.g., before decoding s(t)) by a processing device (e.g., a central processing unit, such as CPU 253 of FIG. 2). In some embodiments, receiver 308 may be configured to pass a message (e.g., based on ranging message 314) for further processing and/or transmission to transmitter 310 and pass a message (e.g., the same message as was passed to transmitter 310) to a processing device. In some embodiments, reflector 304 may be configured to receive ranging message 314 and generate returned ranging message 316 entirely in the analog domain, e.g., without converting the analog signal to a digital signal at any point. In some embodiments, reflector 304 may be configured to pass a signal based on message 314 to an analog-to-digital converter, e.g., to send to a processing device, and direct the signal to a digital-to-analog converter before supplying the message to transmitter 310. Returned ranging message 316 may be generated without the involvement of a processing device in either case (e.g., generation of returned ranging message 316 may not be dependent upon decoding s(t)). Returned ranging message 316 may be received by receiver 312 of initiator 302 and utilized by system 300 for localization and/or ranging.

Figure 4A:
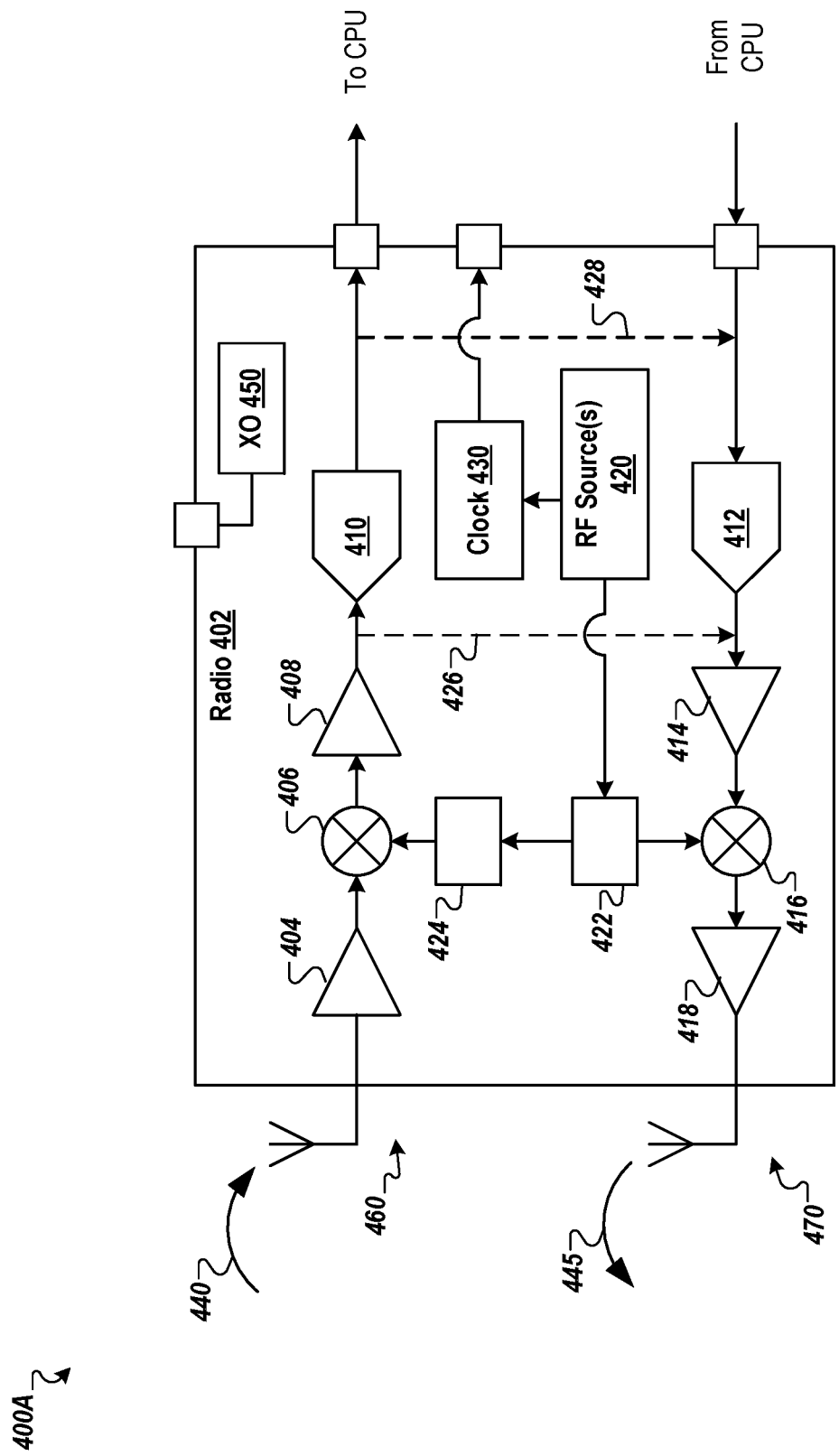
FIG. 4A is a block diagram depicting portions of an exemplary wireless device configured for multi-band communication and localization/ranging, according to some embodiments.

FIG. 4A is a block diagram depicting portions of exemplary wireless device 400A (e.g., including first radio 235 of FIG. 2) configured for multi-band communication and localization/ranging, according to some embodiments. Wireless device 400A is described as acting as a reflector (e.g., reflector 304 of FIG. 3), though analogous circuitry, components, operations, etc., are applicable to an initiator device (e.g., initiator 302 of FIG. 3). Wireless device 400A may include input components 460 (e.g., RX chain, first RFFE, components including components 404 through 410, or the like) and output components 470 (e.g., TX chain, second RFFE, including components 412 through 418, etc.).

Device 400A may receive a first message 440 (e.g., ranging message 314 of FIG. 3) through a wireless communication antenna. First message 440 may be of a particular frequency. In some embodiments, first message 440 may be of a first frequency associated with a channel of the 2.4 GHz wireless communication band. The first message may cause a signal to be generated, which is passed to receiving circuitry 404. Receiving circuitry 404 may include, for instance, one or more filters (e.g., band pass filter, low/high pass filters, etc.), amplifiers, or other components associated with the reception of a wireless transmission. The signal may then be passed to frequency converter 406. In some embodiments, frequency converter 406 may receive a frequency conversion input (e.g. based on the first message) and mix the frequency conversion input with an RF source to generate a frequency-converted output signal. In some embodiments, frequency convertor 406 may convert a signal from the first frequency (e.g., associated with the 2.4 GHz wireless communication band) to a second frequency (e.g., a baseband frequency). In some embodiments, output of radio frequency (RF) source 420 may be mixed with a signal by frequency converter 406 (e.g., frequency difference mixing) to generate a baseband signal. In some embodiments, RF source 420 output may be converted before mixing in frequency converter 406, e.g., by multipliers 422 and/or 424.

As discussed in connection with FIG. 3, transmitted message 440 may be of the form $$M_r = s(t)e^{i\omega_r t}.$$

Frequency converter 406 may perform operations altering the frequency of the signal, e.g., converting the signal to a baseband frequency. In some embodiments, a transmitted message of the form above may be used to generate a baseband signal of the form (ignoring noise)

$$S_b = s(t-\tau_1-\tau_2)e^{i(\omega_r-\omega_{m,1})(t-\tau_1-\tau_2)},$$

where $S_b$ is the baseband signal, $\tau_1$ is a delay associated with message transmission (e.g., message airtime, which is indicative of the distance between two devices), $\tau_2$ is a delay associated with processing the signal by device 400A, $\omega_{m,1}$ is a first mixing frequency, and $\omega_r - \omega_{m,1}$ is the baseband frequency.

RF source 420 may include a phase-locked loop (PLL), phase-locked dielectric resonator oscillator (PDRO), or any other device/configuration for generating an oscillating signal. RF source 420 may be phase-locked to an external crystal oscillator (XO) 450. In some embodiments, RF source 420 may be frequency tunable, e.g., to provide functionality for mixing different baseband frequencies, different output frequencies, etc. RF source 420 may comprise a tunable RF source. In some embodiments, one RF source 420 may be utilized on both input components 460 and output components 470 of radio 402 (e.g., as input into both frequency converters 406 and 416). In some embodiments, multiple RF sources 420 may be included in radio 402, e.g., one each for the input components 460 and output components 470 of radio 402. In some embodiments, the inclusion of multiple RF sources 420 may provide additional flexibility of frequency conversion operations. In some embodiments, RF source 420 that is utilized for frequency conversion of signals in radio 402 may also be utilized as input to clock 430 (e.g., a clock generator), which may be used for other processes, e.g., in operations of analog-to-digital convertor (ADC) 410 (e.g., for controlling sampling rate), digital-to-analog converter (DAC) 412, etc.

After frequency conversion by frequency converter 406, the signal is passed to signal processing circuitry 408. Similar to receiving circuitry 404, signal processing circuitry 408 may include one or more components configured to process the signal, e.g., amplifiers, filters, noise reduction components, or the like. In some embodiments, the signal may then be passed via connection 426 from input components 460 to output components 470, e.g., connection 426 may supply a signal from input circuitry to output circuitry, connection 426 may bypass a processor, connection 426 may route a signal from an RX chain to a TX chain, etc. The signal passed via connection 426 may be an analog baseband signal. Transmitting a signal (e.g., based on incoming message 440) directly to output components 470 (e.g., without converting the signal to a digital signal, without processing the signal by a processing device such as a central processing unit, or the like) may decrease processing delay and other effects that have a detrimental effect on ranging operations.

In some embodiments, a signal (e.g., the same signal passed to output components 470) is also provided to analog-to-digital converter 410. In some embodiments, additional processing may be performed before providing the signal to analog-to-digital converter 410. In some embodiments, a device used for ranging operations may not include an analog-to-digital converter, a link to a CPU, a digital-to-analog converter, or other components shown in FIG. 4A. The digital signal output by analog-to-digital converter 410 may be sent to a processing device (e.g., a CPU of device 400A).

In some embodiments, instead or in addition to connection 426 carrying an analog signal from input components 460 to output components 470, radio 402 may include a communication link 428 for carrying a digital signal from input components 460 to output components 470 (e.g., communication link 428 may supply a signal to output components, communication link 428 may route a signal from a RX chain to a TX chain, communication link 428 may bypass a processor or CPU, etc.). In some embodiments, information may be received from the CPU and added to the reflected/echo message, e.g., additional data may be added to the signal that is used to generate the returned ranging message in the digital domain. Additional information may be included in the returned ranging message, e.g., ranging transmissions may also be used for communication. Digital-to-analog converter 412 may be utilized to generate an analog output at the baseband frequency from digital input, for example, a digital reflected/echo message for ranging/localization (e.g., via link 428), in some embodiments combined with additional information (e.g., received from a CPU).

Processing circuitry 414 may receive a reflected message, e.g., for ranging/localization, and in some embodiments including information for communication, and perform processing operations on that message. Processing operations of processing circuitry 414 may include, for example, filtering, noise reduction, amplification, or the like. Analog reflected signal (e.g., the signal utilized to generate a returned ranging message) may then be transmitted to frequency converter 416.

Frequency converter 416 may be configured to mix output of RF source 420 with the baseband reflected signal to generate a signal for transmission. In some embodiments, an output of frequency converter 416 may be of a second wireless communication frequency, e.g., different than the frequency of message 440. In some embodiments, the frequency of the signal after conversion of frequency converter 416 may belong to a second wireless communication band, e.g., a channel of the 5 GHz communication band. For purposes of illustration, not to be understood as limiting, a baseband message, according to some embodiments, may take the form $$S_b = s(t-\tau_1-\tau_2)e^{i(\omega_r-\omega_{m,1})(t-\tau_1-\tau_2)},$$

Frequency mixing operations of frequency converter 416 may alter the carrier frequency, an output signal may be of the form $$S_e = s(t-\tau_1-\tau_2)e^{i(\omega_r-\omega_{m,1}+\omega_{m,2})(t-\tau_1-\tau'_3)},$$

wherein $S_e$ denotes the echo signal (e.g., the reflected signal, associated with the returned ranging message), $\tau_1$ again denotes airtime delay, $\tau_3$ is a processing delay term including any additional delays up to generation of $S_e$ (e.g., including delays accounted for in the $\tau_2$ term of previous equations), $\omega_{m,2}$ is a second mixing frequency, and $\tau'_3$ denotes the possible loss of phase information during frequency conversion operations, processing operations, etc. The set of terms $\omega_r-\omega_{m,1}+\omega_{m,2}$ may be the output frequency of device 400A, e.g., the frequency of message 445. In some embodiments, the frequency of message 445 may be a wireless communication frequency, e.g., a channel of the 5 GHz wireless communication band.

One or more multipliers (e.g., multipliers 424 and 422, though other arrangements of one or more RF sources 420 and multipliers are considered) may be utilized to generate frequencies for mixing. Described below is one exemplary embodiment that includes an arrangement of RF source 420 and various frequency converting components for receiving a signal in the 2.4 GHz communication band and transmitting an echoed signal (e.g., reflected signal, a returned ranging message, etc.) in the 5 GHz band. In one embodiment, an incoming message may be at a frequency belonging to the 2.4 GHz wireless communication band (e.g., a frequency channel of the 2.4 GHz band). A single RF source may be used for frequency conversion, outputting a signal with a frequency of 3.5 GHz. Output from RF source 420 may be passed through frequency multipliers 422 and 424 for mixing with incoming signals in input components 460. In one embodiment, frequency of output from RF source 420 may be multiplied by 3/2 by multiplier 422. Multipliers 422 and 424 may include a single component or multiple components coupled together, such as a 3/2 multiplier including a frequency tripler and a frequency divider. Output from multiplier 422 may be sent to multiplier 424 and then to frequency converter 406 for mixing with incoming signals. In some embodiments, multiplier 424 may multiply the frequency of input signals by ½. In some embodiments, RF source 420 may output a signal with a frequency of about 3.5 GHz, which may be multiplied by 3/2 and ½ by multipliers 422 and 424 to generate a first mixing frequency of about 2.6 GHz. Frequency converter 406 may mix frequencies of incoming signals (e.g., about 2.4 GHz) and output of multiplier 424 (e.g., about 2.6 GHz) to generate a signal at baseband frequency, about 2000 MHz. Frequency converter 416 may mix a baseband signal with output of multiplier 422 with a frequency of about 5.2 GHz to generate a signal for transmission with a frequency of about 5.5 GHz.

In some embodiments, a different arrangement of components is contemplated. For example, in some embodiments radio 402 may include two or more RF sources, e.g., two independently tunable RF sources. These two RF sources may be synchronized, e.g., for compensation of a phase difference between the sources, between signals mixed with the two sources, etc. In some embodiments, a first RF source may be associated with input components 460, and the second RF source may be associated with output components 470. RF reference signals of each set of components (e.g., input components 460 and output components 470) may be multiplied and/or frequency-converted independently. In some embodiments, output of one RF source 420 may be separately frequency-converted for different sets of components (e.g., input and output components 460 and 470 may not share frequency multiplier 422). In some embodiments, multiple multiplier chains may be available, e.g., to provide additional frequency range selectivity.

Output of frequency converter 416 may be sent to transmission circuitry 418, which may include components for preparing a message for transmission (e.g., amplifiers, filters, or the like). Output components 470 may then transmit message 445 (e.g., an echo/reflected/returned message for ranging). For purposes of illustration, and not limitation, the returned ranging message received by an initiator device may be of the form $$S_e = s(t-2\tau_1-\tau_4)e^{i(\omega_r-\omega_{m,1}+\omega_{m,2})(t-2\tau_1-\tau'_4)},$$

wherein $M_e$ is the echo message (e.g., the returned ranging message) received at the initiator device, $\tau_1$ denotes one-way delay time due to airtime as a message is passed between an initiator and reflector device, $\tau_4$ and $\tau'_4$ are related to processing delays, e.g., including delays formerly denoted $\tau_2$ and $\tau_3$. Initiator device may extract s from the echo message (e.g., returned ranging message), and compare sent signal including s(t) to received signal including $s(t-2\tau_1-\tau_4)$ to determine a delay between the two messages. In some embodiments, processing delays (e.g., as expressed in $\tau_4$) may be accounted for (e.g., by estimating processing delays of components included in radio 402, by utilizing training messages, or the like). Airtime delay $\tau_1$ may be extracted and compared to the speed of light to determine a physical separation between initiator and reflector devices.

In some embodiments, s(t) may comprise a normal communication message, e.g., the form of s(t) may encode information to be passed between devices of the wireless network. In some embodiments, s(t) may be of a form optimized for ranging, e.g., a chirp, a wide-band signal, an orthogonal frequency-division multiplexing signal, or the like.

Figure 4B:
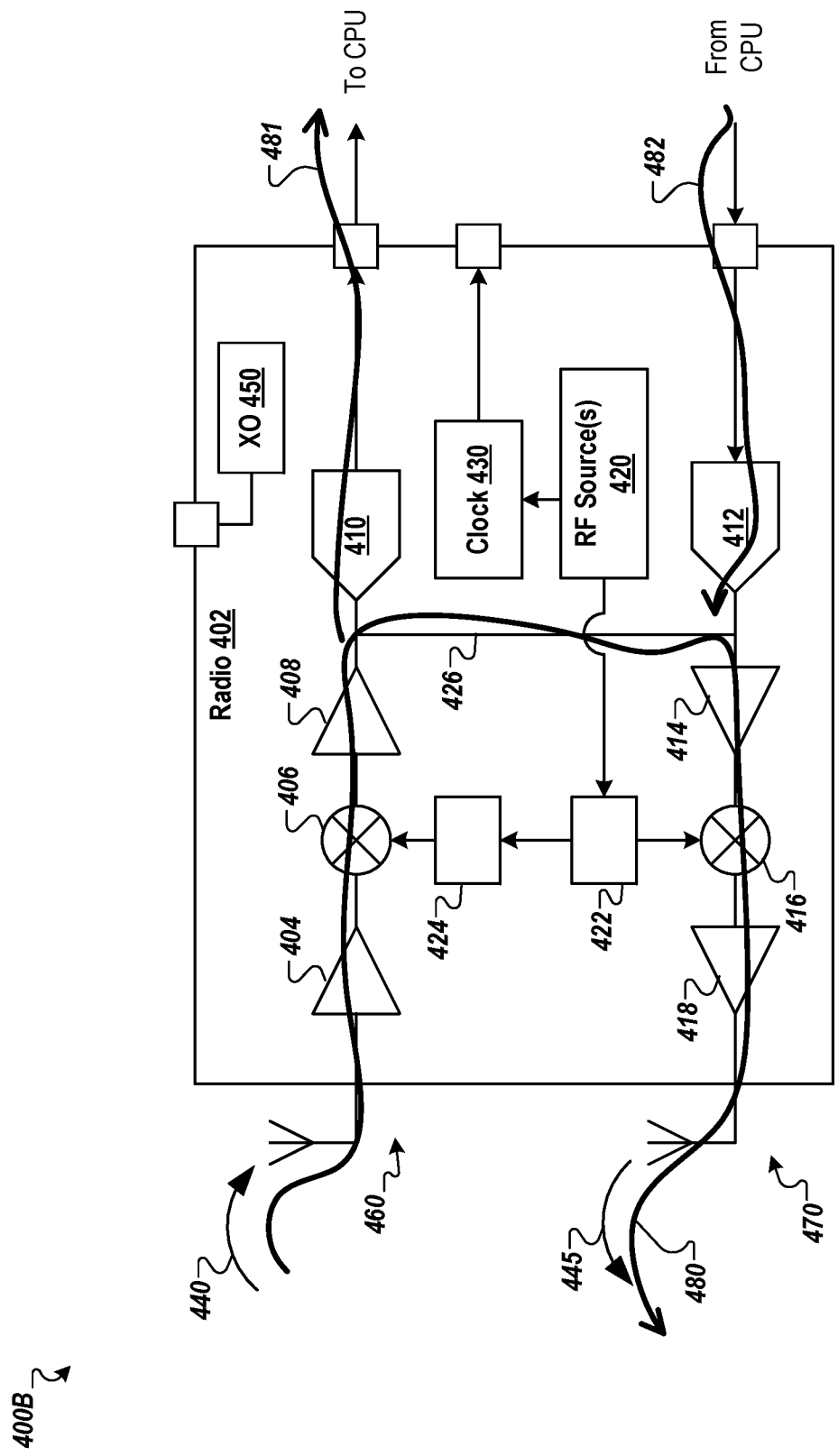
FIG. 4B is a block diagram depicting data flow in a wireless device for wireless signal reflection in the analog domain, according to some embodiments.

FIG. 4B is a block diagram depicting data flow 480 in wireless device 400B for wireless signal reflection in the analog domain, according to some embodiments. Wireless device 400B may share features with wireless device 400A, e.g., include some of the same components at wireless device 400A, facilitate some of the same functionalities as wireless device 400A, etc. In some embodiments, wireless device 400A may include components for both analog (e.g., as depicted as data flow 480) signal reflection and hybrid analog/digital (e.g., as depicted as data flow 490 of FIG. 4C) signal reflection. In some embodiments, a wireless device may include components for analog signal reflection, e.g., as wireless device 400B.

Data flow 480 may begin as an incoming signal is detected by an antenna of wireless device 400B. Data flow 480 may continue to one or more signal reception components, e.g., low noise amplifiers, frequency filters, etc. (e.g., receiving circuitry 404). Data flow 480 continues to frequency converter 406. Frequency converter 406 may be configured to down-convert the frequency of an incoming signal associated with data flow 480, e.g., from a communication frequency to a baseband frequency. Frequency converter 406 may mix an incoming signal with a frequency standard, e.g., an output of RF source 420, to perform frequency conversion. In some embodiments, various frequency converters of device 400B may be associated with different outputs of an RF source 420, e.g., associated with different frequency multiplication chains. In some embodiments, frequency converters of device 400B may be associated with two or more RF sources (not shown). Data flow 480 may then continue through signal processing circuitry 408, which may include one or more amplifiers, one or more filters, or the like. In some embodiments, data flow 480 may branch, and the signal may be sent to a processing unit (e.g., via analog-to-digital converter (ADC) 410) as well as to a TX chain for signal reflection.

Data flow 480 may continue via connection 426 to carry the signal (e.g., an analog signal carried at the baseband frequency) from reception circuitry to transmission circuitry. Additional signal processing components, such as filters, amplifiers, etc., may be present in the path of data flow 480 after connection 426 (e.g., represented by processing circuitry 414 and transmission circuitry 418). Transmission circuitry may include a second frequency converter, which may accept a second frequency standard, e.g., a second output of RF source 420 (e.g., via a different multiplication chain), output from a second RF source (not shown), or the like. Frequency converter 416 may convert the signal from a baseband frequency to a transmission frequency. In some embodiments, the signal received by device 400B may have been received at a first frequency in a first frequency band, and the signal transmitted (e.g., the reflected signal) may be transmitted at a second frequency in a second frequency band. In some embodiments, the first frequency band may be the 2.4 GHz wireless communication band, and the second frequency band may be the 5 GHz wireless communication band. Data flow 480 continues through an antenna for wireless transmission to one or more other devices, e.g., for performing localization and/or ranging operations.

FIG. 4B includes additional data flows 481 and 482. Data flow 481 provides information from the incoming signal (e.g., message 440) to a CPU of wireless device 400B. In some embodiments, radio 402 may include further components for detecting a target message (e.g., a target header, a target field within a header, the beginning of a data packet, etc.) in the analog domain.

Data flow 482 provides information (e.g., from the CPU of wireless device 400B) for transmission. In some embodiments, data of data flow 482 may be provided responsive to detecting a data packet, e.g., a ranging signal. Data flow 482 may add data to (e.g., sum with the signal of) the reflected signal of data flow 480, or may add data to the end of the signal associated with data flow 480 (e.g., concatenate the signals). These data additions may improve system security, protect the system from bad actors, or the like.

Figure 4C:
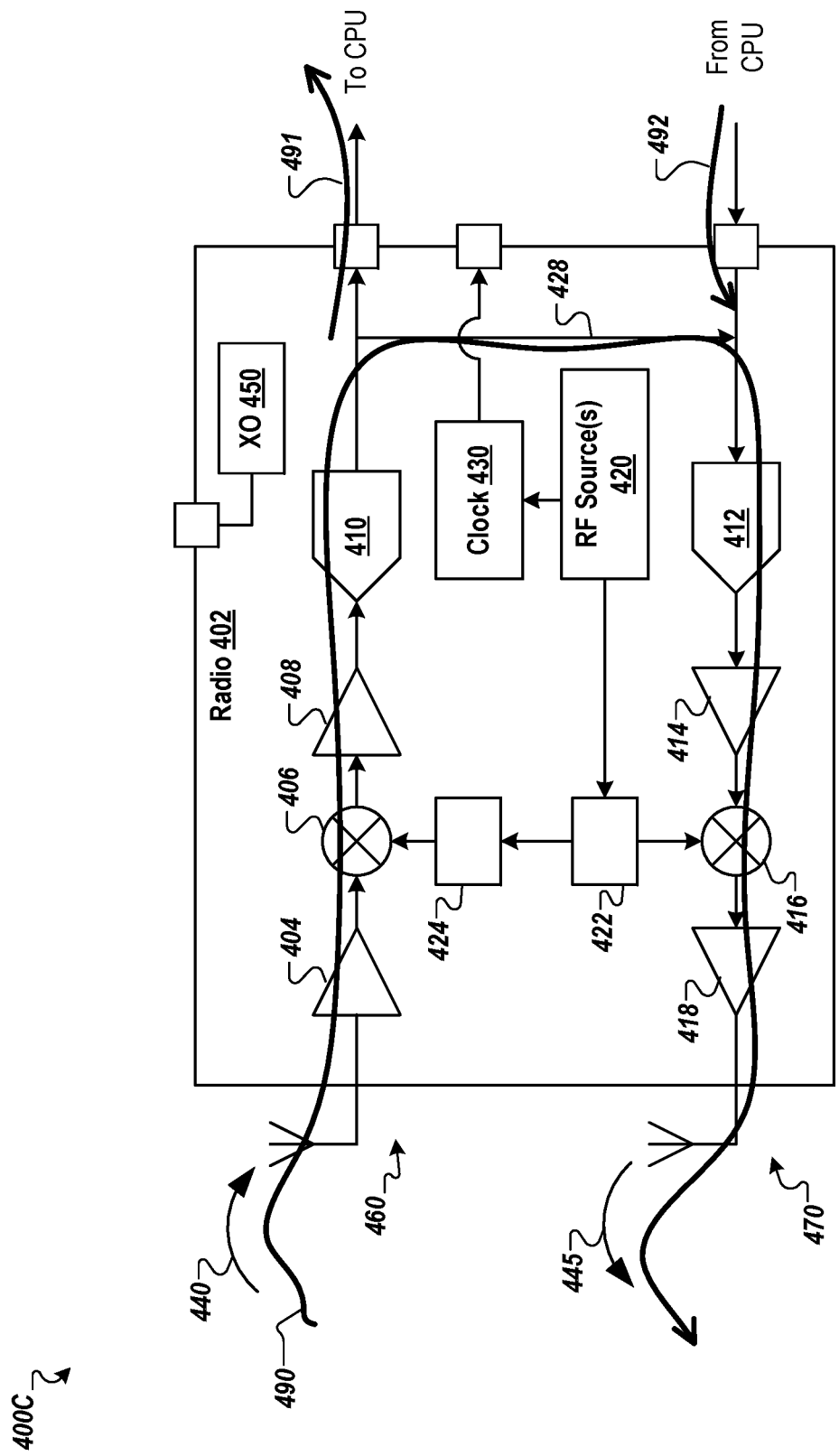
FIG. 4C is a block diagram depicting data flow in a wireless device for wireless signal reflection using a hybrid analog/digital reflection method, according to some embodiments.

FIG. 4C is a block diagram depicting data flow 490 in wireless device 400C for wireless signal reflection using a hybrid analog/digital reflection, according to some embodiments. Data flow 490 may share features with data flow 480, e.g., reception by an antenna at a first frequency, signal processing and conversion to a baseband frequency, frequency conversion to a transmission frequency, and transmission via an antenna.

Data flow 490 may begin upon detection of a wireless signal (e.g., first message 440) via an antenna. The signal may be transmitted to one or more components for signal processing, e.g., reception circuitry 404 and signal processing circuitry 408 may include amplifying the signal, filtering the signal, etc. Data flow 490 may include frequency conversion, e.g., from a first frequency in a first frequency band associated with first message 440 to a baseband frequency.

Data flow 490 may continue to ADC 410 to convert the signal from the analog domain to the digital domain. After ADC 410, data may be transmitted to a processing unit (e.g., CPU of device 400C). Data may also be transmitted via link 428 to output components 470. In some embodiments, data flow 490 may be altered in the digital domain by input from device 400C, e.g., from a CPU of device 400C. This may allow for communication operations and ranging operations of device 400C to overlap in time.

Data flow 490 continues through digital-to-analog converter (DAC) 412, where the digital data is converted to an analog signal. Data flow 490 continues through output components 470, e.g., signal processing and/or amplification may be performed, frequency conversion to a transmission frequency (e.g., belonging to a second frequency band) may be performed, and a transmission signal (e.g., message 445) may be transmitted from device 400C via an antenna.

FIG. 4C further includes data flows 491 and 492. Data flow 491 provides data (e.g., in the digital domain) from ADC 410 to a CPU of wireless device 400C. Data flow 492 provides data (e.g., in the digital domain) from the CPU for integration with data of data flow 490. For example, additional data via data flow 492 may be supplied in the digital domain for concatenation with the signal associated with data flow 490, for summation with the signal associated with data flow 490, or the like. Data flows 491 and 492 may facilitate combining a communication message with a ranging message, e.g., a single message may be utilized for both communication operations and ranging/localization operations. Data flows 491 and 492 may provide security for the system, e.g., may prevent wireless device 400C from being disrupted by another device.

Figure 4D:
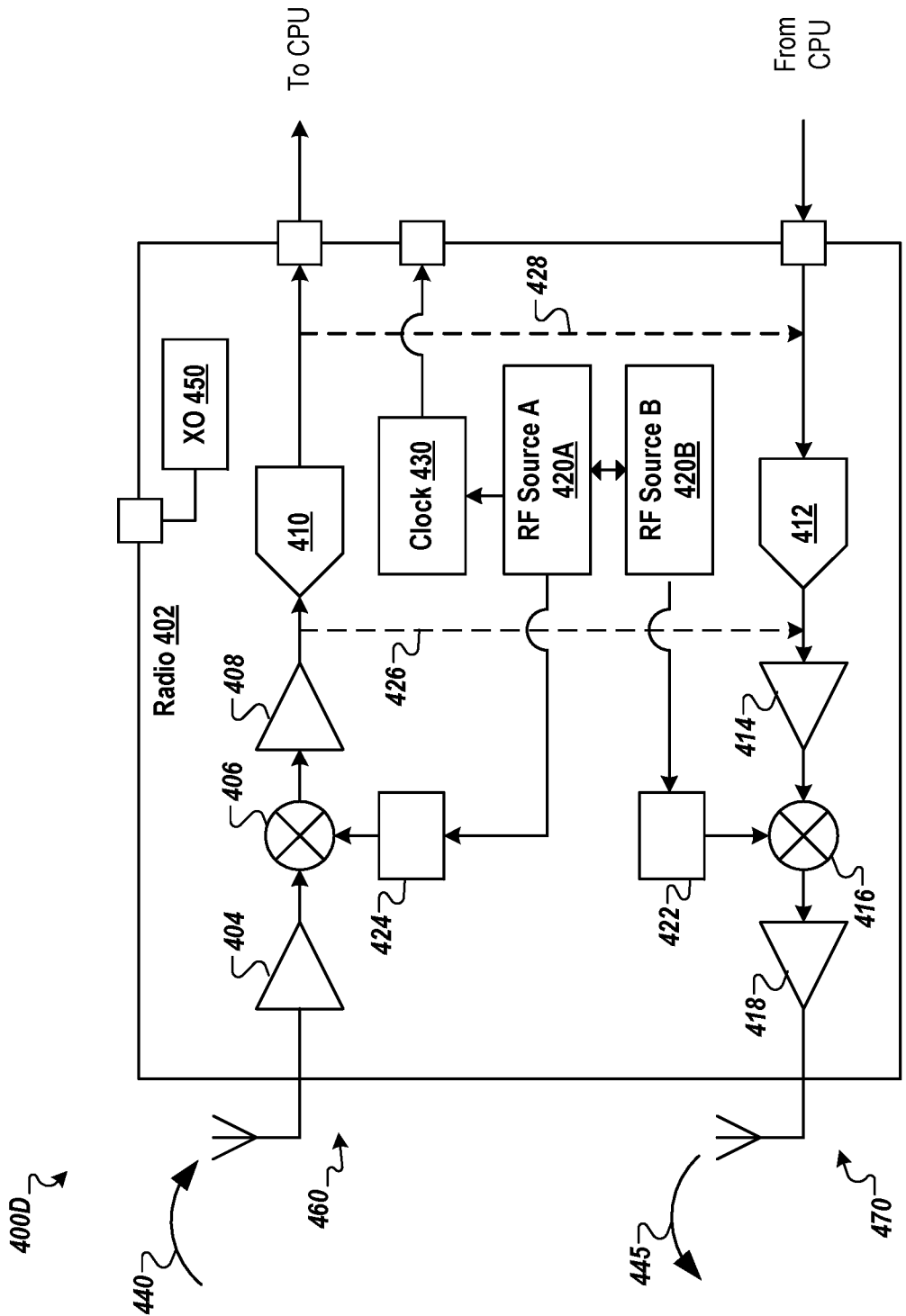
FIG. 4D is a block diagram depicting portions of an example wireless device configured for multi-band communication and localization/ranging, including multiple radio frequency sources, according to some embodiments.

FIG. 4D is a block diagram depicting portions of an example wireless device 400D configured for multi-band communication and localization/ranging, including multiple radio frequency sources, according to some embodiments. Wireless device 400D may share features with wireless device 400A of FIG. 4A, e.g., input components 460, output components 470, first message 440, etc.

In some embodiments, frequency mixing of a message input to wireless device 400D (e.g., frequency mixing to generate a signal of a baseband frequency from message 440) may be facilitated by a different RF source than frequency mixing of an output message (e.g., frequency mixing a signal at a baseband frequency to generate a signal at an output frequency). Device 400D includes two RF sources, RF source A 420A and RF source B 420B. Output of RF source A 420A may be transformed to a different frequency (e.g., by multiplier 424). Multiplier 424 may include one or more multiplication steps, e.g., may include a frequency tripler and two frequency dividers to generate a signal with a frequency approximately a factor of ¾ different from the frequency of output directly generated by RF source A 420A. Output of RF source A 420A (e.g., a different output of RF source A 420 A than the output used for frequency mixing by frequency converter 406, an output modified by a different multiplier chain, or the same output used for mixing by frequency converter 406) may be used as input into clock 430, e.g., for control of ADC 410 and/or DAC 412.

RF source B 420B may facilitate operation of frequency converter 416, e.g., to convert to baseband frequency signal to a signal at a target output frequency. Output from RF source B 420B may be frequency converted by multiplier 422. RF source A 420A and RF source B 420B may be synchronized (indicated by the double-headed arrow) to ensure that a phase difference between signals generated by the two RF sources may be accounted for.

In some embodiments, the connectivity of components of wireless device 400D may be somewhat different, e.g., an RF source associated with an output frequency converter may be utilized to facilitate operation of clock 430. Inclusions of two RF sources may increase frequency flexibility of the system, e.g., allow independent selection of input frequency and output frequency.

Figure 5:
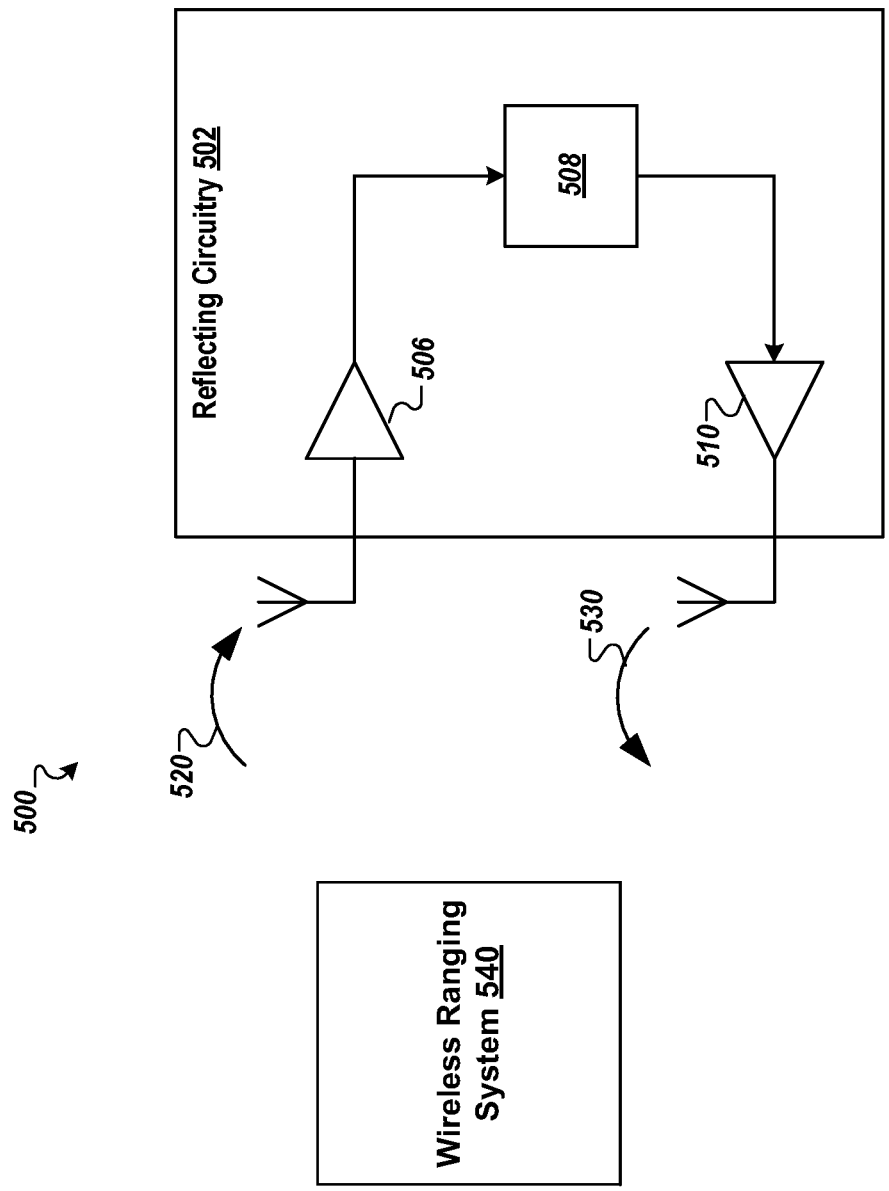
FIG. 5 is a diagram depicting a reflector device for localization and/or ranging, according to some embodiments.

FIG. 5 is a diagram depicting a reflector device 500 for localization and/or ranging, according to some embodiments. Reflector device 500 may include reflecting circuitry 502, e.g., for generating a reflected/echo message for localization and/or ranging operations. Reflector device 500 may receive a ranging message 520. Ranging message 520 may be received from wireless ranging system 540. Wireless ranging system 540 may include one or more wireless devices. Wireless ranging system 540 may include a wireless device such as initiator 302 of FIG. 3, which may include components, circuitry, etc., such as those depicted in FIG. 4A. Wireless ranging system 540 may include a device such as a 2×2 Wi-Fi device. Ranging message 520 may be of a first frequency, for example, ranging message 520 may belong to a channel of the 2.4 GHz wireless communication band. A signal (e.g., generated by ranging message 520) may be received by receiving circuitry 506. In some embodiments, reflector device 500 may be an active reflector, and receiving circuitry may include powered components, e.g., active amplifiers. Receiving circuitry may include one or more amplifiers, one or more filters, or other signal processing components. Output of receiving circuitry 506 may be provided to frequency converter chain 508. In some embodiments, frequency converter chain 508 may include a single frequency multiplier. In some embodiments, frequency converter chain 580 may include several components, e.g., two 3/2 frequency multipliers. In some embodiments, ranging message 520 may be of a first frequency of a first frequency band, e.g., a first wireless communication band (such as the 2.4 GHz band, the 5 GHz band, the 6 GHz band, the 7 GHz band, the 60 GHz band, or the like). Frequency converter chain 508 may be configured to convert the frequency of the signal to a second frequency belonging to a second frequency band. In some embodiments, ranging message 520 may belong to the 2.4 GHz wireless communication band (e.g., ranging message 520 may be associated with a carrier frequency belonging to the 2.4 GHz communication band), and after frequency conversion by frequency converter chain 508 the output signal may be approximately 5.5 GHz.

Output of frequency converter chain 508 may be passed to transmission circuitry 510, which may include further signal processing components (e.g., amplifiers, filters, etc.). Returned ranging message 530 may be generated from output of transmission circuitry 510. In some embodiments, reflector device 500 may be a passive reflector device, e.g., a passive radio frequency identification (RFID) tag. In some embodiments, reflector device 500 may be an active reflector device, e.g., an active RFID tag. An active reflector device may be externally powered, may include active components (e.g., one or more active amplifiers), or the like.

Returned ranging message 530 may be received by wireless ranging system 540, e.g., for ranging and/or localization operations. In some embodiments, returned ranging message 530 may be received by the same device as transmitted ranging message 520. In some embodiments, returned ranging message 530 may be received and ranging message 520 transmitted by a device configured according to aspects of this disclosure, e.g., wireless device 400A of FIG. 4A. In some embodiments, returned ranging message 530 may be received and ranging message 520 transmitted by separate radios, separate antennas, or the like. In some embodiments, returned ranging message 530 may be received and ranging message 520 transmitted by different devices of wireless ranging system 540.

Figure 6A:
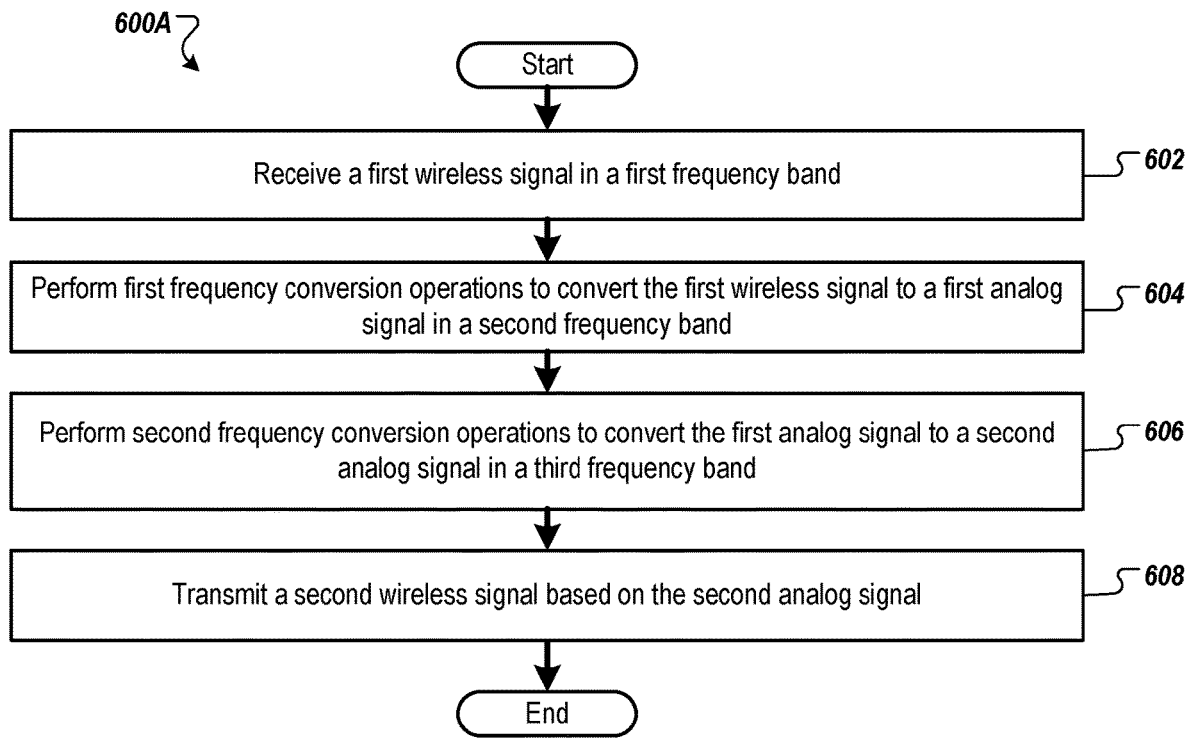
FIG. 6A is a flow diagram of a method for performing reflection operations associated with localization and/or ranging, according to some embodiments.

FIG. 6A is a flow diagram of a method 600 for performing reflection operations associated with localization and/or ranging, according to some embodiments. At block 602, a wireless communication device receives a first wireless signal in a first frequency band. In some embodiments, the first frequency band may be a first set of wireless communication channels, e.g., the 2.4 GHz wireless communication band, the 5 GHz band, the 60 GHz band, etc. The wireless communication device may receive the first signal via an antenna and a first radio frequency front end (RFFE) circuit, e.g., circuitry configured to assist in receiving wireless signals, in some embodiments including one or more RF filters, one or more RF amplifiers, one or more frequency mixers, etc. In some embodiments, the first signal may be received by a receive (RX) chain, e.g., a collection of coupled components (e.g., antennas, amplifiers, filters, etc.) for receiving RF wireless communications.

At block 604, the wireless communication device performs first frequency conversion operations to convert the first wireless signal to a first analog signal in a second frequency band. In some embodiments, the wireless communication device may include an RF source, e.g., a phase-locked loop. First frequency conversion operations may be performed by mixing an output of the RF source with input associated with the first wireless signal. The first output arm of the RF source may include one or more multipliers, e.g., the first output of the RF source may be frequency multiplied by one or more factors to generate a signal of the second frequency band. The second frequency band may be a baseband frequency.

In some embodiments, the first analog signal may be provided to a digital-to-analog converter. The digital-to-analog converter may be configured to generate a digital signal, e.g., for additional signal processing, for transmission to a processor (e.g., a central processing unit), or the like. In some embodiments, the digital signal (e.g., output from the digital-to-analog converter) may be adjusted in the digital domain. For example, digital encoding circuitry may be employed (e.g., for data security), additional information may be added to the signal (e.g., reflection and ranging operations may be performed utilizing the same messages, frequency channels, transmissions, air time, etc., as communication), etc. The additional information may come from circuitry associated with the reflection circuit (e.g., encryption circuitry, encoding circuitry, etc.), from a processor (e.g., the central processing unit), etc. For example, an intermediate signal of the reflection circuitry may include the result of performing encoding upon a digital signal based on the received message to be reflected. The reflection circuitry may further include an analog-to-digital converter for converting the digital signal (in some embodiments, updated in the digital domain) to an analog signal.

In some embodiments, the digital-to-analog converter and/or the analog-to-digital converter may accept timing input, e.g., to determine sampling rate. In some embodiments, the RF source (e.g., used for frequency conversion of signals associated with ranging operations) may be utilized to generate timing input for the converters. In some embodiments, an output of the RF source may be provided to a clock generation system, which may generate signals controlling timing (e.g., sampling rate) for the converters.

At block 606, the wireless communication device performs second frequency conversion operations to convert the first analog signal to a second analog signal in a third frequency band. In some embodiments, the signal converted to the third frequency band may be received from the digital-to-analog converter. In some embodiments, the signal converted to the third frequency band may have been altered in the digital domain. In some embodiments, analog signals may be passed from the RX chain to the transmit (TX) chain, e.g., without entering the digital domain.

In some embodiments, second frequency conversion operations may be performed by a second frequency mixer. The second frequency mixer may receive as input, second output of the RF source. The second output arm of the RF source may include one or more frequency conversion components (e.g., a frequency conversion circuit, a frequency multiplier, etc.). In some embodiments, the first output arm and the second output arm of the RF source may share one or more multiplication components, e.g., two RF output arms shown in FIG. 4A include frequency multiplier components 422. In some embodiments, the second frequency mixer may receive, as input, output from a second RF source (e.g., a second PLL). In some embodiments, RF sources may be tunable, e.g., for providing access to different frequency ranges/channels. In some embodiments, one RF source associated with the RX chain and a second RF source associated with the TX chain may increase flexibility of the reflection/ranging system.

At block 608, the wireless communication device transmits a second wireless signal based on the second analog signal. In some embodiments, transmission operations may be performed by a second RFFE circuit, by the TX chain, etc. In some embodiments, the second wireless signal is of a frequency belonging to the third frequency band. In some embodiments, the third frequency band is a wireless communication band, e.g., the 2.4 GHz band, the 5 GHz band, etc. In some embodiments, the first frequency band may be different than the third frequency band, e.g., a ranging signal may be provided in the 2.4 GHz band, and an echo/reflection message for ranging operations may be generated in the 5 GHz band.

Figure 6B:
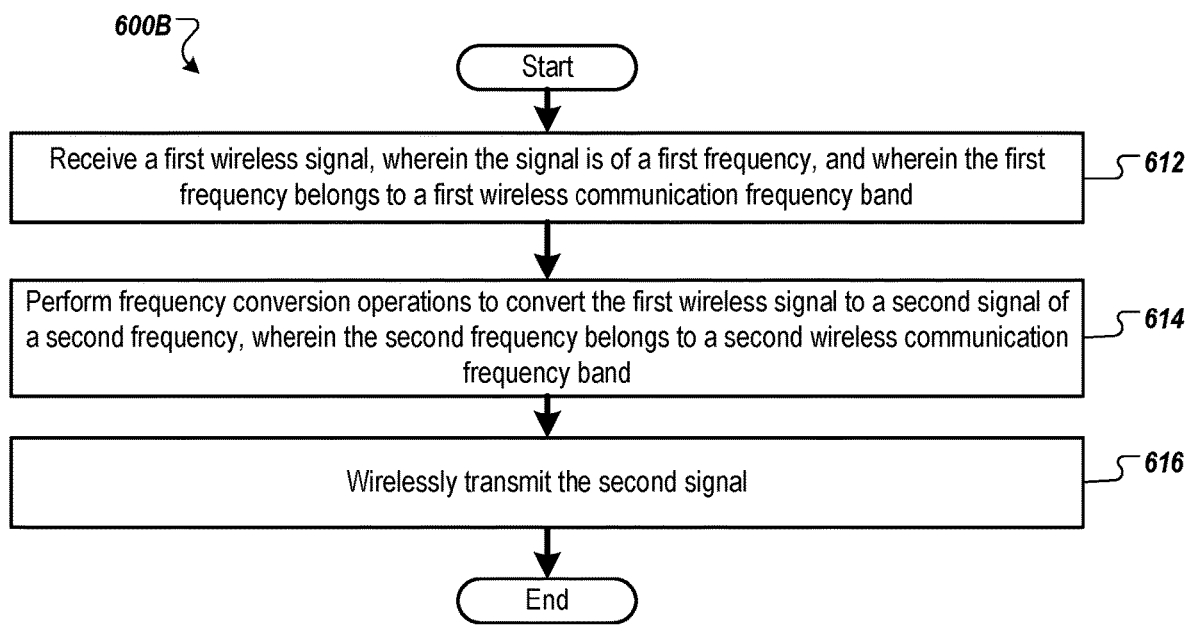
FIG. 6B is a flow diagram of a method of operations of a reflector device for ranging, according to some embodiments.

FIG. 6B is a flow diagram of a method 600B of operations of a reflector device for ranging, according to some embodiments. At block 612, the reflector device receives a first wireless signal. The signal is of a first frequency. The first frequency belongs to a first wireless communication frequency band. In some embodiments, the first wireless communication frequency band may be the 2.4 GHz band, the 6 GHz band, the 7 GHz band, the 60 GHz band, etc. At block 614, the reflector device performs frequency conversion operations to convert the first wireless signal to a second signal of a second frequency. The second frequency belongs to a second wireless communication frequency band. In some embodiments, the frequency conversion operations may comprise one or more frequency mixing operations. For example, output of an RF source may be mixed with a signal to generate a signal with a frequency that is the difference between the input frequencies, the sum of the input frequencies, etc. In some embodiments, the frequency conversion operations may comprise one or more frequency multiplication operations. For example, an input in the 2.4 GHz band may be passed through a frequency multiplication chain to multiply the frequency of the signal by a factor of 9/4 to generate an output approximately in the 5 GHz communication band. At block 616, the reflector device wirelessly transmits the second signal.

Figure 6C:
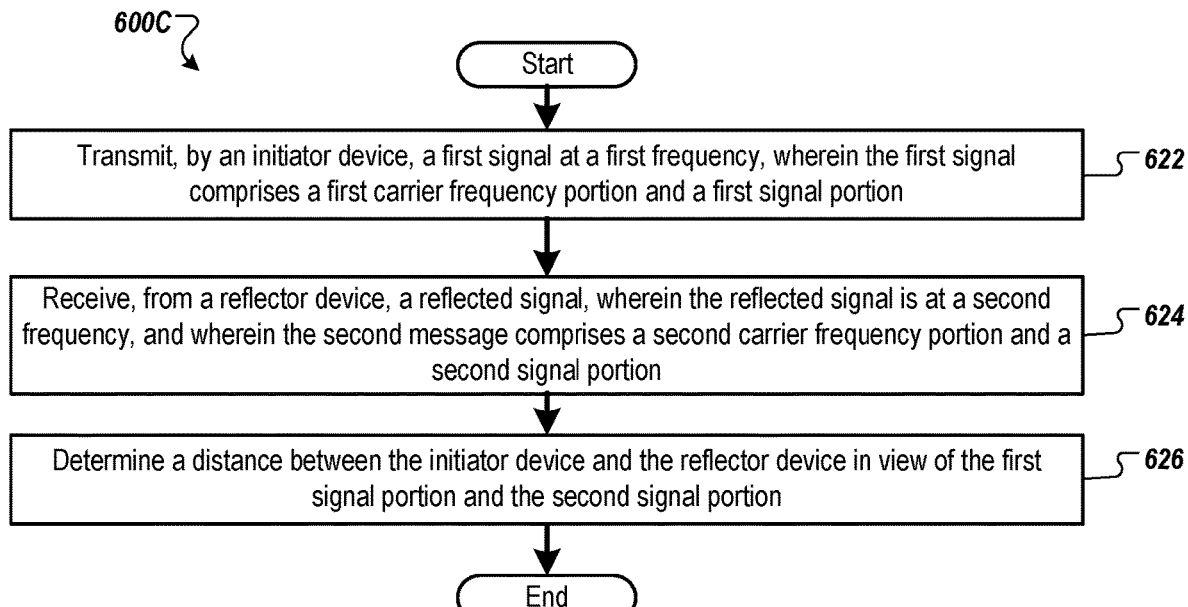
FIG. 6C is a flow diagram depicting a method of operations of an initiator device for ranging, according to some embodiments.

FIG. 6C is a flow diagram depicting a method 600C of operations of an initiator device for ranging, according to some embodiments. At block 622, an initiator device wirelessly transmits a first signal to a second device, e.g., a reflector device. Ranging operations may target estimating the distance between the initiator and reflector devices. The first signal may include a first carrier frequency portion and a first signal portion (e.g., a modulation of the carrier signal that carries information). The first frequency may be of a first frequency band, e.g., may be a channel of the 2.4 GHz communication band.

At block 624, the initiator device receives a reflected signal from the second device. The reflected signal is of a second frequency. In some embodiments, the second frequency may be of a second frequency band. The reflected signal comprises a second carrier frequency portion and a second signal portion. In some embodiments, the signal portion may be the same (e.g., be indicative of the same information) as the signal portion of the first signal. In some embodiments, the signal portion of the reflected signal may be different than the signal portion of the first signal, e.g., the reflector device may have altered the signal portion of the first signal with additional or different information.

At block 624, the initiator device determines a distance between the initiator device and the reflector device. The determination is made based on the first signal portion (e.g., the signal portion associated with the signal transmitted by the initiator device) and the second signal portion (e.g., the signal portion associated with the signal returned to the initiator device by the reflector device). In some embodiments, a comparison is made by the initiator device between the first signal portion and the second signal portion. In some embodiments, a signal comprising the first signal portion and a signal comprising the second signal portion may be mixed (e.g., by a frequency mixer) and the output analyzed to determine the distance between devices.

Figure 6D:
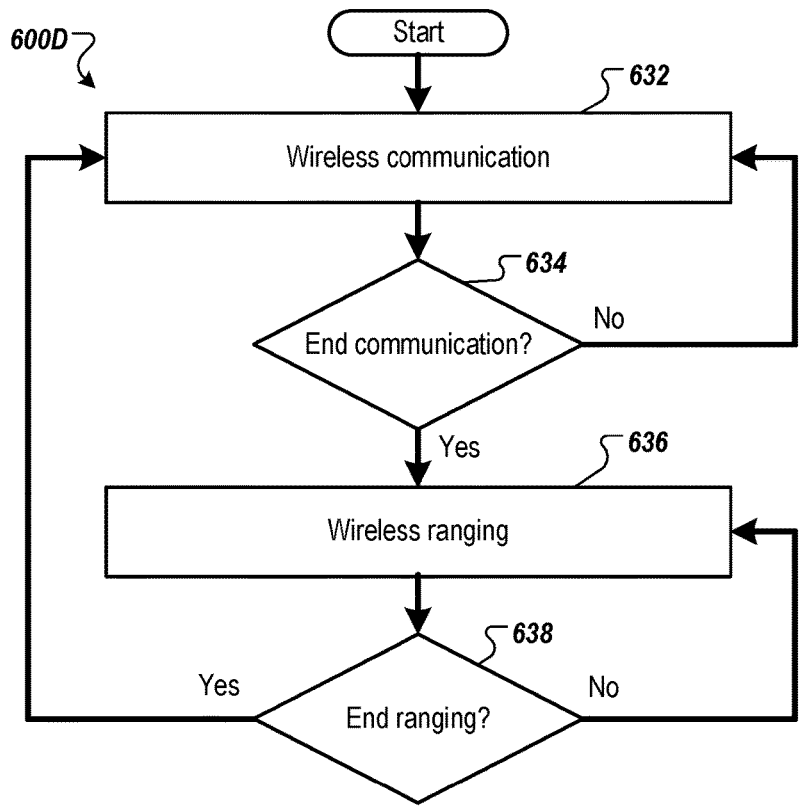
FIG. 6D depicts a flow diagram of a method for performing wireless communication and ranging operations between wireless devices, according to some embodiments.

FIG. 6D depicts a flow diagram of a method 600D for performing wireless communication and ranging operations between wireless devices, according to some embodiments. In some embodiments, ranging operations and communication operations may both be performed between two wireless devices. In some embodiments, ranging signals may be combined with communication symbols. In some embodiments, as depicted in method 600D, ranging operations and communication operations may be performed at different times.

At block 632, wireless communication operations are performed. Various messages may be passed between wireless devices. In some embodiments, one wireless device may act as an access point device, and another may act as a station device, e.g., one wireless device may be in communication with a wired network (an access point device), and the second device may only be in communication via one or more wireless networks (the station device). At block 634, a determination is made determining whether communication operations have been completed, e.g., an amount of information meeting a threshold has been communicated, a threshold amount of time between ranging operations has been reached, etc. In some embodiments, the determination of block 634 may be performed by an access point device. In some embodiments, the determination of block 634 may be performed by a station device. In some embodiments, the determination may be made by a device not participating in the network communication, e.g., an external control device. If communication has not been completed, wireless communication operations of block 632 are performed.

If communication has been completed, wireless ranging operations of block 636 are performed. Wireless ranging operations may include localization operations. Wireless ranging operations may be performed according to any embodiments described herein, or equivalents. Wireless ranging operations may be performed by an initiator device and a reflector device. An initiator device may be an access point device, a station device, etc. A reflector device may be an access point device, a station device, etc. In some embodiments, initiator and reflector devices may be temporary roles, e.g., one device may, for a first ranging operation, act as initiator, and for a second ranging operation, act as a reflector. At block 638, a determination is made whether ranging operations have concluded. Similar criteria to those of block 634 may be utilized in making the determination of block 638. If wireless ranging operations have not been concluded, wireless ranging operations of block 636 may be performed. If wireless ranging operations have concluded, flow may return to block 632, and further wireless communication operations may be performed.

Figure 7A:
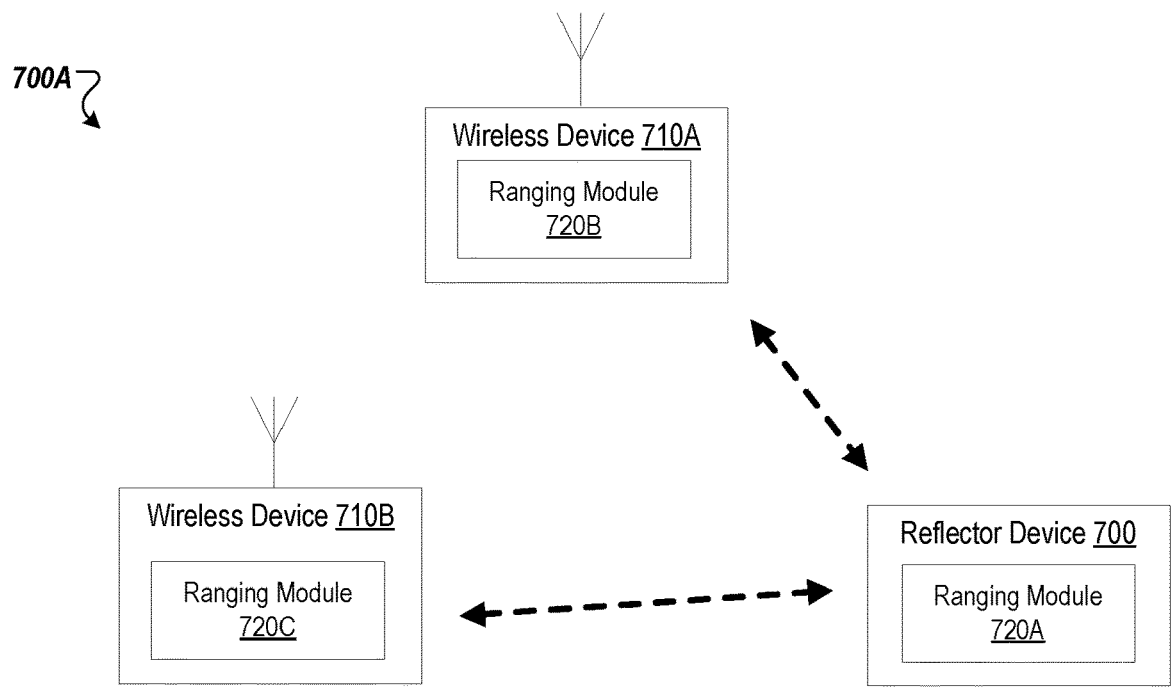
FIG. 7A depicts a block diagram of an example localization system 700A, according to some embodiments.

FIG. 7A depicts a block diagram of an example localization system 700A, according to some embodiments. Localization system 700A includes wireless devices 710A and 710B and reflector device 700. In some embodiments, reflector device 700 may be a wireless communication device containing hardware and/or software facilitating ranging operations, e.g., reflector device 700 may be wireless device 400A of FIG. 4A, including ranging module 720A for signal reflections and/or frequency conversion. In some embodiments, reflector device 700 may be a device including reflector circuitry, e.g., reflector device 500 of FIG. 5. Ranging module 720A may be configured to receive a signal from a device of localization system 700A and generate a reflected signal. Ranging module 720A may be configured to receive a signal in a first frequency band (e.g., the 2.4 GHz wireless communication band) and generate a reflected signal in a second frequency band (e.g., the 5 GHz wireless communication band).

In some embodiments, reflector device 700 may be a mobile device (e.g., a handheld device, an ID badge, etc.) and localization system 700A may be configured to calculate a relative location of reflector device 700 (e.g., relative to other devices of localization system 700A). In some embodiments, wireless devices 710A and 710B may be stationary devices. In some embodiments, ranging operations (e.g., as described in FIGS. 6A and 6C) may be performed between reflector device 700 and wireless devices 710A and 710B. Wireless devices 710A and 710B may perform ranging operations via ranging modules 720B and 720C, e.g., hardware and/or software facilitating ranging operations. Wireless devices 710A and 710B may be access point devices. Wireless devices 710A and 710B may act as initiator devices for ranging, e.g., if reflector device 700 is an RFID tag, a passive reflector device, or the like. Ranging operations may be used for localization, e.g., estimating distance of reflector device 700 from multiple wireless devices 710 may allow for an estimate of the location of reflector device 700 with respect to the wireless devices 710. In some embodiments, more than two wireless devices 710 may be utilized for localization, e.g., three or more wireless devices 710A may be utilized in some systems. Localization system 700A may be configured to localize several devices, e.g., multiple reflector devices including ranging modules may be included in localization system 700A. Localization system 700A may be utilized, for example, for indoor navigation operations.

Figure 7B:
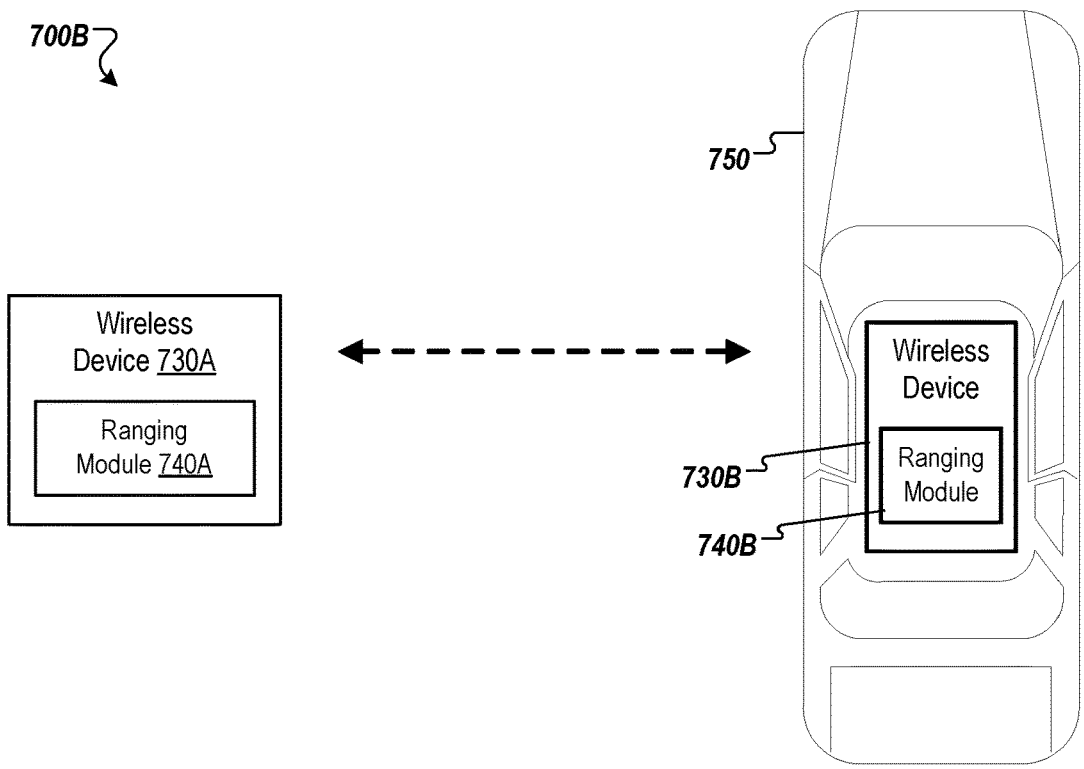
FIG. 7B depicts a block diagram of an example ranging system 700B, according to some embodiments.

FIG. 7B depicts a block diagram of an example ranging system 700B, according to some embodiments. Ranging system 700B may be configured to calculate, track, or perform one or more actions based on the distances between devices. In some embodiments, ranging system 700B may be a keyless entry system for a vehicle 750.

Ranging system 700B includes wireless devices 730A and 730B. Wireless device 730A includes ranging module 740A. Ranging module 740A may facilitate wireless device 730A performing ranging operations. For example, ranging module 740A may include hardware, software, etc., configured to perform ranging operations. In some embodiments, wireless device 730A may act as an initiator device for ranging operations. In some embodiments, wireless device 730A may act as a reflector device for ranging operations.

Wireless device 730B may be associated with vehicle 750, e.g., may be a vehicle-based access point device. In some embodiments, wireless device 730B may be a controller area network (CAN) device. Wireless device 730B includes ranging module 740B. Ranging module 740B may include software, hardware, etc., for facilitating wireless ranging operations. In some embodiments, wireless device 730B may act as an initiator for wireless ranging operations, may act as a reflector for wireless ranging operations, etc. In some embodiments, wireless device 730B may be coupled to further operations of vehicle 750. For example, wireless device 730A may be a device kept in the possession of a vehicle owner, e.g., an RFID tag, a keyless entry device, a mobile phone, etc. When an associated device is detected to be within a threshold distance of wireless device 730B, wireless device 730B may cause an action to occur in vehicle 750, such as unlocking a door, starting an engine, starting climate control operations, or the like.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine-readable, computer accessible, or computer-readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A circuit, comprising:
   a receive (RX) chain, wherein the RX chain is configured to receive a first signal of a first frequency in a first frequency band;
   a transmit (TX) chain, wherein the TX chain is configured to transmit a second signal of a second frequency in a second frequency band, different from the first frequency band; and
   an active reflection circuit coupled between the RX chain and the TX chain, wherein the active reflection circuit comprises:
      a frequency conversion scheme, wherein the frequency conversion scheme comprises a radio frequency (RF) source, and wherein the frequency conversion scheme utilizes one or more frequency mixers that accept as input (i) a first output of the RF source of a first mixing frequency and (ii) a signal of a second mixing frequency and produce as output a signal of a third mixing frequency, wherein the third mixing frequency is a sum or difference of the first and second mixing frequencies, wherein the frequency conversion scheme is configured to:
      receive an input signal from the RX chain, wherein the input signal is of the first frequency;
      convert the input signal to an output signal of the second frequency; and
      provide the output signal to the TX chain.

2. The circuit of claim 1, wherein the frequency conversion scheme is configured to:
   mix a frequency conversion input of the first frequency with the first output of the RF source to generate an intermediate signal of a third frequency; and
   mix the intermediate signal with a second output of the RF source to generate a frequency conversion output signal of the second frequency.

3. The circuit of claim 1, wherein the frequency conversion scheme comprises:
   a first tunable radio frequency (RF) source;
   a first frequency multiplier chain coupled to the first tunable RF source;
   a second tunable RF source; and
   a second frequency multiplier chain coupled to the second tunable RF source, wherein:
      an output of the first frequency multiplier chain is mixed by a first frequency converter with a frequency conversion input of the first frequency to generate an intermediate signal of a third frequency; and
      the intermediate signal is mixed by a second frequency converter with an output of the second frequency multiplier chain to generate a frequency conversion output of the second frequency.

4. The circuit of claim 1, wherein the active reflection circuit further comprises:
   an analog-to-digital converter; and
   a digital-to-analog converter.

5. The circuit of claim 4, further comprising a radio frequency (RF) source and a clock generator, wherein the clock generator receives, as input, output from the RF source, and wherein a sampling rate of the analog-to-digital converter is controlled by output from the clock generator.

6. The circuit of claim 1, wherein the first frequency is a wireless communication frequency of a first of either a 2.4 GHz, a 5 GHz, a 6 GHz, a 7 GHz, or a 60 GHz wireless communication frequency bands, and wherein the second frequency is a wireless communication frequency of a second of either the 2.4 GHz, the 5 GHz, the 6 GHz, the 7 GHz, or the 60 GHz wireless communication frequency bands, wherein the second wireless communication frequency band is different from the first.

7. A method, comprising:
receiving a first wireless signal having a first frequency at a signal reflection circuit, and wherein the first frequency belongs to a first wireless communication frequency band;
converting, by the signal reflection circuit, the first wireless signal to a second signal having a second frequency, wherein the second frequency belongs to a second wireless communication frequency band, and wherein converting the first wireless signal to a second signal comprises:
providing output from a first radio frequency (RF) source to a first frequency mixer;
providing an input signal indicative of the first wireless signal to the first frequency mixer, wherein the input signal is of the first frequency;
receiving as output from the first frequency mixer an intermediate signal, wherein the intermediate signal is of a third frequency;
providing output from a second RF source to a second frequency mixer; and
providing the intermediate signal to the second frequency mixer; and
receiving as output from the second frequency mixer an output signal, wherein the output signal is of the second frequency, and wherein the second signal is based on the output signal; and
wirelessly transmitting the second signal.

8. The method of claim 7, wherein converting the first wireless signal to the second signal comprises:
providing a first output of a radio frequency (RF) source to a first frequency mixer;
providing an input signal indicative of the first wireless signal to the first frequency mixer, wherein the input signal is of the first frequency; and
receiving as output from the first frequency mixer an intermediate signal, wherein the intermediate signal is of a third frequency different from the first and second frequencies.

9. The method of claim 8, wherein the RF source comprises a phase-locked loop.

10. The method of claim 8, wherein converting the first wireless signal to the second signal further comprises:
providing a second output of the radio frequency (RF) source to a second frequency mixer;
providing the intermediate signal to the second frequency mixer; and
receiving as output from the second frequency mixer an output signal, wherein the output signal is of the second frequency, and wherein the second signal is based on the output signal.

11. The method of claim 7, further comprising:
providing a first intermediate signal to an analog-to-digital converter; and
receiving a second intermediate signal from a digital-to-analog converter.

12. The method of claim 11, further comprising:
providing a first digital signal based on the first intermediate signal to a processor.

13. The method of claim 11, wherein the second intermediate signal includes results of encoding performed upon output of the analog-to-digital converter based on the first intermediate signal.

14. The method of claim 7, wherein converting the first wireless signal to the second signal comprises providing the first wireless signal to a multiplier chain, wherein the multiplier chain is configured to receive as input a signal of a frequency belonging to the first wireless communication frequency band and generate as output a signal of a frequency belonging to the second wireless communication frequency band.

15. A device, comprising:
a processor;
a first radio frequency front end (RFFE) circuit, wherein the first RFFE circuit is to receive a first signal at a first frequency;
a second RFFE circuit; and
reflection circuitry coupled between the first RFFE circuit and the second RFFE circuit, wherein the reflection circuit comprises:
a first frequency converter, wherein the first frequency converter is to receive from the first RFFE circuit a second signal at the first frequency, and generate as output a third signal at a second frequency, wherein the second signal is based on the first signal;
a second frequency converter;
a first circuit to supply the third signal from the first frequency converter to the second frequency converter, wherein the first circuit routes the third signal from the first frequency converter to the second frequency converter through the processor; and
a second circuit to supply the third signal from the first frequency converter to the second frequency converter, wherein the second circuit routes the third signal from the first frequency converter to the second frequency converter, bypassing the processor,
wherein the second RFFE circuit it to receive a fourth signal at a third frequency from the second frequency converter, and wherein the second RFFE circuit is to transmit a transmission signal based on the fourth signal at the third frequency.

16. The device of claim 15, wherein the first frequency is associated with a communication channel of a 2.4 GHz wireless communication band, and wherein the third frequency is associated with a communication channel of a 5 GHz wireless communication band.

17. The device of claim 15, further comprising a radio frequency (RF) source, wherein a first output of the RF source is utilized by the first frequency converter to generate the third signal, and wherein a second output of the RF source is utilized by the second frequency converter to generate the fourth signal.

18. The device of claim 15, wherein the first circuit comprises:
an analog-to-digital converter coupled between the first RFFE and the processor; and
a digital-to-analog converter coupled between the processor and the second RFFE, and wherein the second circuit comprises the analog-to-digital converter coupled to the digital-to-analog converter, bypassing the processor.

* * * * *